United States Patent
Imaizumi et al.

(10) Patent No.: US 8,277,924 B2
(45) Date of Patent: Oct. 2, 2012

(54) PANEL-SHAPED MOLDED PRODUCT

(75) Inventors: Hiroyuki Imaizumi, Hiratsuka (JP); Masayuki Akada, Hiratsuka (JP); Ken Shimomai, Hiratsuka (JP); Yoshihiro Kayano, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 719 days.

(21) Appl. No.: 12/440,781

(22) PCT Filed: Sep. 7, 2007

(86) PCT No.: PCT/JP2007/000980
§ 371 (c)(1), (2), (4) Date: Aug. 14, 2009

(87) PCT Pub. No.: WO2008/032443
PCT Pub. Date: Mar. 20, 2008

(65) Prior Publication Data
US 2009/0304970 A1 Dec. 10, 2009

(30) Foreign Application Priority Data
Sep. 12, 2006 (JP) .................................. 2006-246309

(51) Int. Cl.
B32B 3/00 (2006.01)
B32B 23/02 (2006.01)
(52) U.S. Cl. ........................................ 428/156; 428/192
(58) Field of Classification Search .................... 428/31, 428/38, 156, 157, 192; 296/146.15
See application file for complete search history.

(56) References Cited

U.S. PATENT DOCUMENTS
4,775,570 A * 10/1988 Ohlenforst et al. ............. 428/83
5,915,780 A   6/1999 Kobrehel et al.

FOREIGN PATENT DOCUMENTS
| EP | 1 595 727 A1 | 11/2005 |
| JP | 59-199228 | 11/1984 |
| JP | 09-164551 | 6/1997 |
| JP | 2001-277284 | 10/2001 |

(Continued)

OTHER PUBLICATIONS

International Search Report for PCT/JP2007/000980, mailed Nov. 13, 2007.

(Continued)

Primary Examiner — Catherine A Simone
(74) Attorney, Agent, or Firm — Nixon & Vanderhye P.C.

(57) ABSTRACT

The present invention relates to a panel-shaped molded product having a laminated structure which is produced from a resin and used for side doors, back doors, hoods, roofs, etc., and exhibits a more excellent finishing accuracy without occurrence of bleed-out along an inner periphery of a frame part and fine distortions on a design part. The panel-shaped molded product of the present invention is a molded product having a laminated structure which is obtained by injection-molding the frame part (2) on one surface of the plate-shaped design part (1) wherein an inner peripheral portion (4) of the frame part (2) is closely attached to the design part, and has a thickness changing region where a thickness of the frame part is reduced toward the side of a center of the frame part such that a ratio between a width of the thickness changing region and the thickness of the frame part (2), and a ratio between a width of the thickness changing region and a width of the frame part (2) are respectively adjusted to satisfy specific relationships.

27 Claims, 8 Drawing Sheets

FOREIGN PATENT DOCUMENTS

| | | |
|---|---|---|
| JP | 2003-171564 | 6/2003 |
| JP | 2003-181893 | 7/2003 |
| JP | 2004-359220 | 12/2004 |
| JP | 2005-161693 | 6/2005 |

OTHER PUBLICATIONS

Extended European Search Report in EP 07 80 5835 dated Mar. 25, 2011.

* cited by examiner (a)

A-A CROSS SECTION (b)

A-A CROSS SECTION (c)

A-A CROSS SECTION (a)

(b) B-B CROSS SECTION (c) C-C CROSS SECTION (a)

(b)

(a) D-D CROSS SECTION (b) D-D CROSS SECTION (c) D-D CROSS SECTION (a) D-D CROSS SECTION (b) D-D CROSS SECTION

E-E CROSS SECTION

A-A CROSS SECTION

PANEL-SHAPED MOLDED PRODUCT

This application is the U.S. national phase of International Application No. PCT/JP2007/000980, filed 7 Sep. 2007, which designated the U.S. and claims priority to Japanese Patent Application No. 2006-246309, filed 12 Sep. 2006, the entire contents of each of which are hereby incorporated by reference.

TECHNICAL FIELD

The present invention relates to a panel-shaped molded product, and more particularly, to a panel-shaped resin molded product used for sunroof windows, quarter windows, rear window, etc., of automobiles which has a laminated structure obtained by injection-molding a frame part on one surface of a plate-shaped design part.

BACKGROUND ART

Automobile panel-shaped parts have a large problem concerning weight reduction thereof, and molded products obtained from fiber-reinforced plastics tend to be used for the panel-shaped parts in place of steel plates. Various studies on automobile windows such as sunroof windows, quarter windows, rear windows, seethrough windows for front passenger seats of trucks have also been made to utilize panel-shaped molded products having a light weight and an excellent design property.

As the panel-shaped molded products, there have been proposed, for example, "two-color molded products" having a two-layer structure as shown in FIG. 11. FIG. 11 is a vertical cross-sectional view partially showing a layer structure of a window frame part of a conventional panel-shaped molded product used as windows for automobiles in which a member represented by reference numeral (1) denotes a window glass formed from a resin, a member represented by reference numeral (2) denotes a window frame, and a member represented by reference numeral (3) denotes an opening defining the window. The panel-shaped molded product as shown in FIG. 11 comprises a design part (1) (transparent portion) of a plate shape which is formed from a transparent resin and constitutes a window glass, and a frame part (2) which is formed from an opaque reinforced resin to which an inorganic filler such as glass fibers and talc is added as a reinforcing material, and constitutes a window frame. These parts of the panel-shaped molded product are integrally laminated with each other by injection molding method (two-color molding or co-injection molding method) (Patent Documents 1 and 2).

The two-color molding method is contemplated to enhance a production efficiency and ensure a beautiful appearance of finished molded products. When producing the above panel-shaped molded product by the two-color molding method, the first material to which the reinforcing material is added is first injected to form the frame part (2), and then the second material (transparent resin) is injected to form the design part (1), so that a residual stress in the design part (1) is reduced to prevent occurrence of deformation such as curvature and waviness thereon. That is, in the two-color-part molding method, the frame part (2) is first injection-molded, and then after allowing a strong shrinkage phenomenon of the frame part to proceed to some extent, the design part (1) is injection-molded, thereby preventing the design part (1) from being adversely influenced by the shrinkage of the frame part (2).

Patent Document 1: Japanese Patent Application Laid-Open (KOKAI) No. 2003-320548

Patent Document 2: Japanese Patent Application Laid-Open (KOKAI) No. 2005-013907

DISCLOSURE OF THE INVENTION

Problem to be Solved by the Invention

Recently, the above panel-shaped molded products such as constitutional parts for design portions of automobiles have been required to have a still higher appearance, i.e., a still higher finishing accuracy. However, upon producing the panel-shaped molded products, the frame part (2) must be first molded from the viewpoint of preventing occurrence of total deformation such as curvature on the design part (1). In this case, when the transparent resin for the design part (1) is injected on the frame part (2), the opaque resin for the frame part (2) which is present at a boundary coming into contact with a flow of such a transparent resin for the design part is melted out into a mold cavity for the design part. As a result, the resin present at an inner periphery of the frame part (2) is slightly bled out toward the side of an opening (3) of the frame part (2), thereby causing problems such as deterioration in design property.

On the other hand, when the design part (1) is first injection-molded, even though the transparent resin therefor which is present at a boundary contacting with the resin for the subsequently injection-molded frame part (2) is slightly melted out, the above bleeding phenomenon is not visually recognized because the melted resin is transparent and is present only within a welding range of the frame part (2). On the contrary, when the design part (1) is first injection-molded, a strong shrinkage of the frame part (2) adversely affects the design part (1), so that the design part (1) tends to suffer from deformation after opening the mold.

The large deformation such as curvature of the design part (1) which is caused upon molding the frame part (2) in the later stage may be inhibited by well controlling retention time and holding pressure up to the mold opening as well as mold temperature upon the mold opening, and further suitably selecting materials used. Howeverr as shown by reference numeral (9) in FIG. 11, the design part (1) tends to suffer from formation of fine recess-like distortions on its front surface at positions corresponding to the inner periphery of the frame part (2) owing to shrinkage of the frame part (2) although they are very fine to such an extent as to be recognizable only by reflection of light. Such very fine distortions (9) on the design part (1) tend to cause significant deterioration in design property in current automobiles requiring a high appearance.

The present invention has been made in view of the above conventional problems. An object of the present invention is to provide a panel-shaped molded product having a laminated structure obtained by injection-molding a frame part on one surface of a plate-shaped design part, which is free from bleed-out of the resin along an inner periphery of the frame part and occurrence of very fine distortions on the design part, and has a more excellent finishing accuracy.

Means for Solving the Problem

To solve the above problems, according to the present invention, there is adopted such a laminated structure in which a design part is injection-molded in a first stage, and then a frame part is injection-molded in a second stage, thereby preventing a resin for the frame part from being melted out into a mold cavity for the design part and avoiding bleed-out of the resin along an inner periphery of the frame part. Further, the frame part is provided in an inner peripheral portion thereof with a thickness changing region in which a thickness of the frame part is reduced toward the side of a center of the frame part, and a ratio of a width of the thickness changing region to a thickness of the frame part as well as a ratio of the width of the thickness changing region to a width of the frame part are respectively controlled to specific ranges, whereby a shrinking force of the inner peripheral portion of the frame part after molded is reduced to such an extent as not to adversely affect the design part previously molded.

That is, in an aspect of the present invention, there is provided a panel-shaped molded product with a laminated structure (multi-layered structure) comprising a plate-shaped design part and a frame part injection-molded on one surface of the design part, wherein the frame part has an inner peripheral portion that is closely attached to the design part and provided with a thickness changing region where a thickness of the frame part is reduced toward a side of a center of the frame part, and a ratio $L_2/t_2$ and a ratio $L_2/L_1$ in which $t_2$ is a thickness of the frame part, $L_1$ is a width of the frame part and $L_2$ is a width of the thickness changing region, satisfy a relationship represented by the following formula (1):

$$(L_2/t_2) \times (L_2/L_1) \geq 0.4 \quad (1).$$

Effect of the Invention

In the panel-shaped molded product of the present invention, since there is adopted a laminated structure in which the frame part is injection-molded on one surface of the plate-shaped design part, it is possible to prevent bleed-out of a resin at an inner periphery of the frame part toward the side of an opening thereof relative to the design part. In addition, since the inner peripheral portion of the frame part is provided with a specific thickness changing region, it is possible to prevent formation of fine distortions on the design part owing to shrinkage of the frame part, thereby attaining a more excellent finishing accuracy of the obtained panel-shaped molded product. Therefore, the panel-shaped molded product of the present invention is suitably applied to design portions such as windows for automobiles.

EXPLANATION OF REFERENCE NUMERALS

1: Design part; 11: Projection; 12: Groove; 14: Projection; 2: Frame part; 20: Stepped portion; 21: Groove; 22: Projection; 23: Groove; 24: Stepped portion; 3: Opening; 4: Inner peripheral portion; 5: Molded panel; 53: Bent projection; 6: Fitting piece; 7: Hard coating layer; 8: Grid; $t_1$: Thickness of design part; $t_2$: Thickness of frame part; $L_1$: Width of frame part; $L_2$ Width of thickness changing region of frame part

BEST MODE FOR CARRYING OUT THE INVENTION

Figure 1:
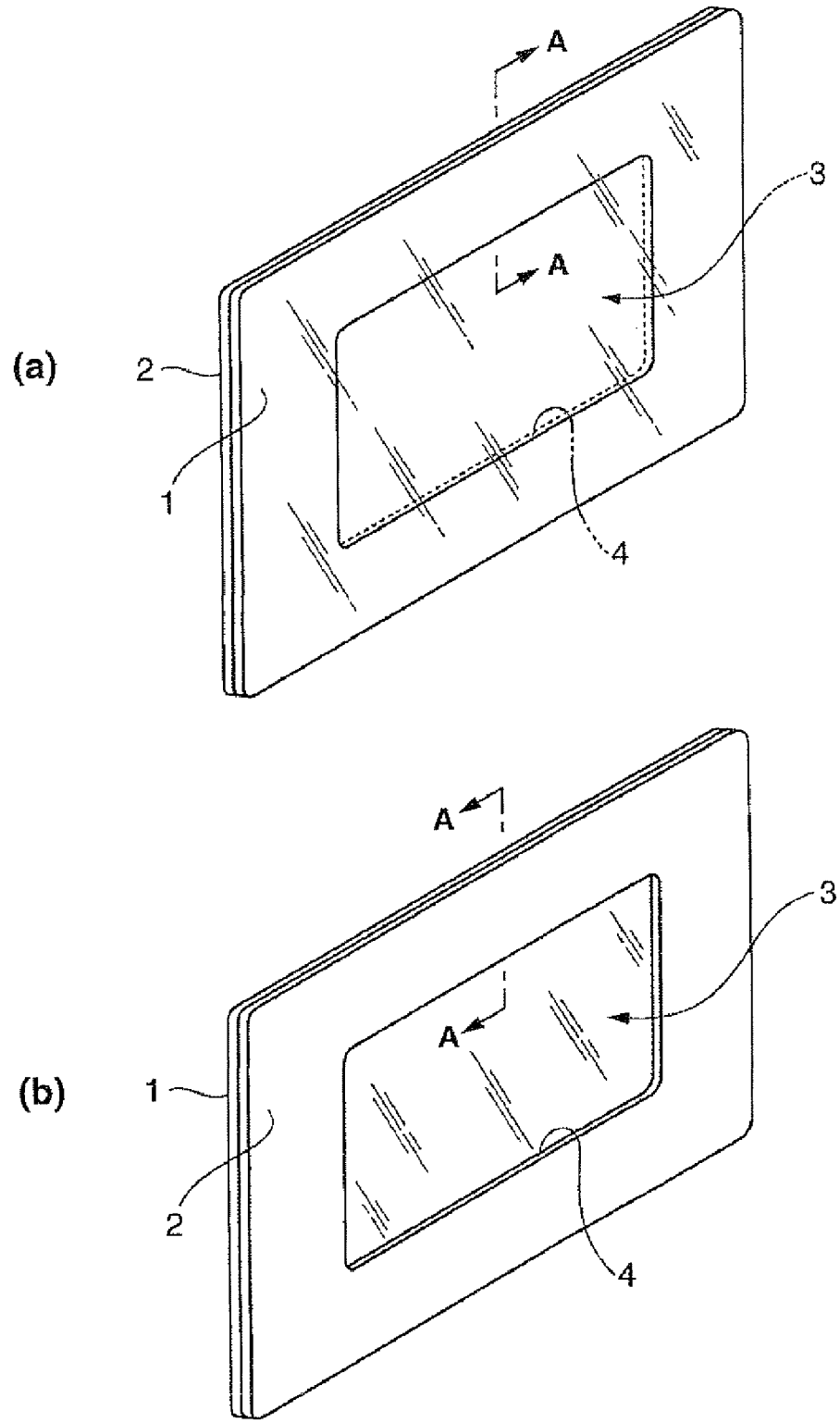
FIG. 1 is perspective views each showing an appearance of an example of a panel-shaped molded product used as a window for automobiles when viewed from a front side and a rear side thereof.
Figure 2:
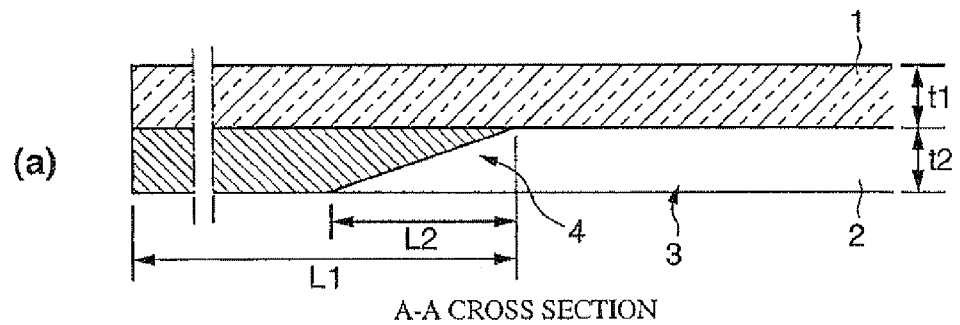
FIG. 2 is vertical cross-sectional views each partially showing a layer structure of the panel-shaped molded product according to the present invention, and a structure of an inner peripheral portion of a frame part.
Figure 2:
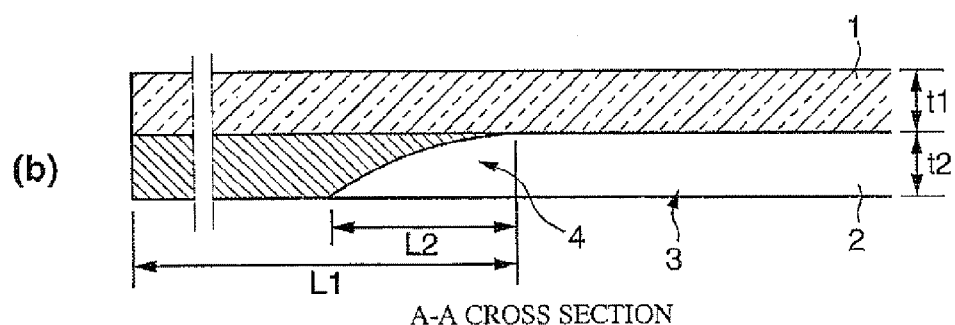
Figure 2:
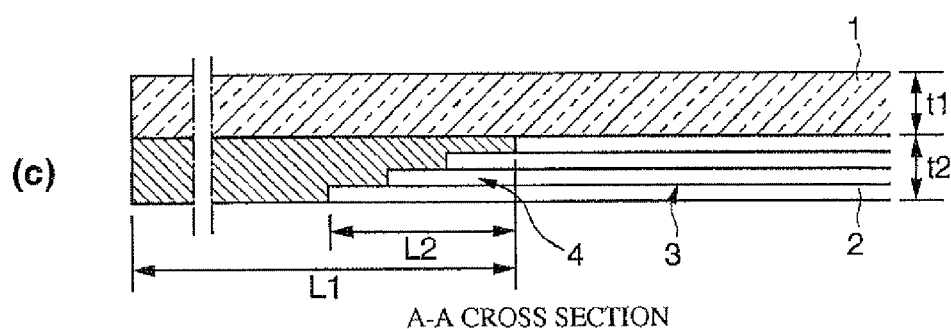
Figure 3:
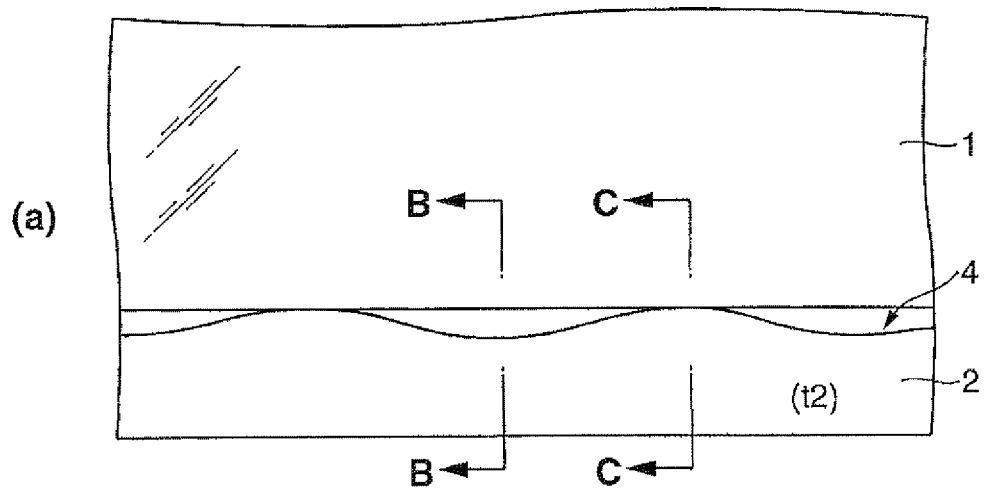
FIG. 3 is a rear side view and vertical cross-sectional views partially showing the panel-shaped molded product of the present invention which has the other pattern of a thickness changing region provided in the inner peripheral portion of the frame part.
Figure 3:
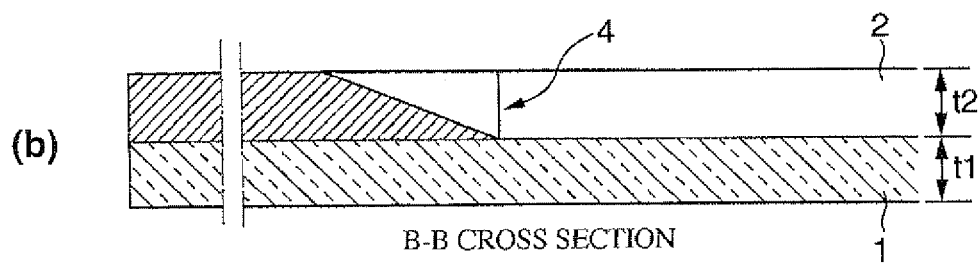
Figure 3:
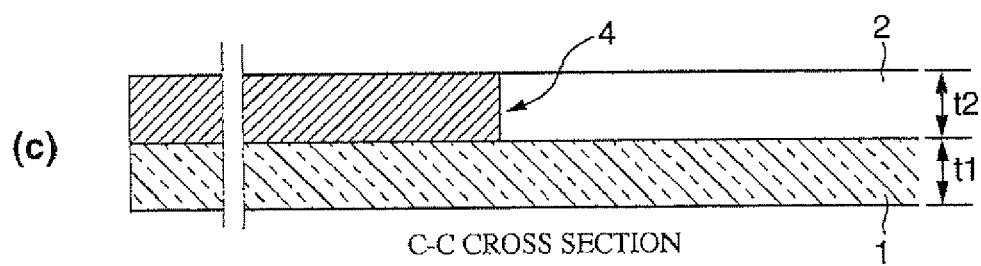

The preferred embodiments of the panel-shaped molded product according to the present invention are explained by referring to the accompanying drawings. The present invention includes the first embodiment as shown in FIGS. 1 to 3 relating to the panel-shaped molded product having a basic structure comprising respective portions corresponding to a window glass and a window frame, and the second embodiment as shown in FIGS. 4 to 9 relating to a resin molded panel as a part of a vehicle body such as a side door and a back door to which the above basic structure is applied. In FIGS. 1 to 3, there are shown an outer contour of the panel-shaped molded product according to the first embodiment as well as an essential structure thereof, whereas in FIGS. 4 to 9, there are shown an outer contour of the panel-shaped molded product according to the second embodiment as well as an essential structure thereof. In addition, in FIG. 10, there is shown a method of evaluating a finished condition of the surface of the panel-shaped molded product.

First, the first embodiment of the present invention is explained. The panel-shaped molded product of the present invention is a resin molded product having a laminated structure which includes a plate-like design part (1) and a frame frame part (2) injection-molded on one surface of the design part as shown in FIG. 1. For example, the panel-shaped molded product is used as a window for vehicles such as automobiles and trains, ships and buildings. Most typical examples of the window include windows for side doors, back doors, slide doors, hoods and roofs of automobiles.

In the case where the panel-shaped molded product is used, for example, for a window of automobiles, the design part (1)

may be formed according to an entire window shape corresponding to the side doors, back doors, slide doors, hoods, roofs, etc., i.e., a whole shape of the window including a window glass and a window frame portion. In FIG. 1, there is illustrated the design part of a square flat plate shape. In the above applications, the design part (1) which also constitutes a portion corresponding to the window glass is produced from a transparent synthetic resin, usually a non-reinforced synthetic resin, and has a thickness of about 3 to 15 mm.

The design part (1) may be formed into a generally flat plate shape, and does not necessarily has a complete flat surface. For example, the surface of the design part (1) may be formed into a moderately curved shape as a whole or a shape partially having a curvature. Also, in the case where the panel-shaped molded product is used for the above windows, the design part (1) has a limited solar radiation transmittance to reduce an amount of heat ray (such as near infrared rays and infrared ray) in a compartment when applied to automobiles or other vehicles, and suppress increase in temperature within the compartment. More specifically, the design part (1) may be produced from the below-mentioned resin composition to control a solar radiation transmittance thereof to less than 60%.

The frame part (2) is a flat plate-shaped member for reinforcing the design part (1) from the side of one surface thereof and trimming the design part (1) corresponding to the window glass to enhance a design property thereof. The frame part (2) is preferably produced from a composite reinforced synthetic resin, and has a thickness of about 1 to 10 mm and preferably about 1 to 6 mm. In the case where the panel-shaped molded product is used, for example, for the windows of automobiles, the frame part (2) is disposed on one surface of the design part (1) which faces to a compartment of automobiles. The overlapping area between the design part (1) and the frame part (2) is less than 40% of an area of the surface of the design part (1) in order to inhibit damage to a design property thereof and ensure a sufficient natural lighting.

As shown in FIG. 1, the frame part (2) may be usually formed into a flat shape extending along an outer periphery of the design part (1) so as to surround a whole outer peripheral portion of one surface of the design part (1). However, the frame part (2) may also be formed into a shape surrounding only a part of an outer peripheral portion of the design part (1) according to kinds of objectives to which the panel-shaped molded product is applied, for example, may be formed into an approximately U-shaped flat plate shape disposed along three sides of the design part (1) having an generally rectangular flat plate shape. In other words, an opening (3) of the frame part (2) may be provided either in a central region thereof as shown in FIG. 1 or in a state offset from the central region to any one side thereof. Further, the opening (3) may be offset toward the one side of the frame part to partially provide a cutout thereon. Meanwhile, the frame part (2) may be provided on the surface thereof with fitting pieces (protrusions as represented by reference numeral (6) in FIGS. 4(*b*) and 5(*b*)) as described hereinlater.

The panel-shaped molded product of the present invention has a laminated structure as described above which is obtained by injection-molding the frame part (2) on one surface of the previously molded design part (1) in order to prevent bleed-out of resin along an inner periphery of the frame part (2). In addition, in the present invention, in order to reduce a shrinking force generated, in particular, on an inner peripheral portion (4) of the frame part (2) (a portion surrounding the opening (3)) when molding the frame part (2), the inner peripheral portion (4) of the frame part (2) is formed into a specific shape. More specifically, as shown in FIG. 2, the inner peripheral portion (4) of the frame part (2) is provided with a thickness changing region which is closely attached to the design part (1) and in which the thickness of the frame part (2) is reduced continuously or stepwise toward the side of a center of the frame part (the side of the opening (3)). With the provision of such a thickness changing region, it is possible to prevent occurrence of fine distortions on the front surface of the design part (1) (surface on the side opposite to the frame part (2)).

The shape of the inner peripheral portion (4) of the frame part (2) includes, for example, those shapes as shown in FIGS. 2(*a*) to 2(*c*). More specifically, as shown in FIG. 2(*a*), the thickness of the inner peripheral portion (4) of the frame part (2) is continuously reduced toward the side of a center of the frame part (2), i.e., gradually reduced, and forms a flat slant surface when viewed in a cross-section thereof taken along a direction perpendicular to a length direction of the inner peripheral portion.

Also, as shown in FIG. 2(*b*), the thickness of the inner peripheral portion (4) of the frame part (2) is gradually reduced toward the side of a center of the frame part (2) similarly to that shown in FIG. 2(*a*), and forms a curved surface concaved toward the side of a boundary between the frame part (2) and the design part (1) when viewed in a cross-section thereof taken along a direction perpendicular to a length direction of the inner peripheral portion.

Further, as shown in FIG. 2(*c*), the thickness of the inner peripheral portion (4) of the frame part (2) is stepwise reduced toward the side of a center of the frame part (2), i.e., sequentially stepwise reduced, and forms a stepped surface stepwise approaching the boundary between the frame part (2) and the design part (1) when viewed in a cross-section thereof taken along a direction perpendicular to a length direction of the inner peripheral portion.

In the inner peripheral portion (4) of the frame part (2), the thickness changing region is usually provided along an entire length of the inner peripheral portion (4). However, the thickness changing region may be provided along a partial length of the inner peripheral portion (4) as long as shrinkage of the inner peripheral portion (4) of the frame part (2) is reduced to such an extent as not to cause distortions on the design part (1). The proportion of an effective length of the thickness changing region relative to the entire length of the inner peripheral portion (4) is usually 50 to 100%. The thickness changing region having a constant width as represented by reference character ($L_2$) is usually formed continuously along the inner peripheral portion (4). When the thickness changing region is formed partially along the inner peripheral portion (4), the width $L_2$ of the thickness changing region may vary at a predetermined pitch and with a predetermined pattern along the length direction of the inner peripheral portion (4) (length direction of the frame part (2)).

More specifically, as shown in FIG. 3, the above thickness changing region may be formed, for example, with such a pattern which is alternately retreated in a wavy form with a constant wavelength toward the side of a center of width of the frame part (2) on the basis of a linearly formed inner periphery of the frame part (2) and is repeated continuously along the length direction of the inner peripheral portion (4) when viewed from a rear side of the panel-shaped molded product. In other words, the inner peripheral portion (4) of the frame part (2) as shown in FIG. 3 has such a structure in which the thickness changing region is continuously projected in a wavy form from an inner peripheral end of a portion with no change in thickness (portion having a thickness of $t_2$) toward the side of the opening (3).

In the present invention, in order to effectively exhibit a function of the above thickness changing region of the frame part (2), as shown in FIG. 2, when $t_2$ denotes a thickness of the frame part (2), $L_1$ denotes a width of the frame part (2) and $L_2$ denotes a width of the thickness changing region, a ratio of the width $L_2$ of the thickness changing region to the thickness $t_2$ of the frame part (2) ($L_2/t_2$) and a ratio of the width $L_2$ of the thickness changing region to the width $L_1$ of the frame part (2) ($L_2/L_1$) are respectively controlled to lie within the ranges represented by the following formulae (1) and (2). Meanwhile, in the present invention, the width $L_1$ of the frame part (2) means a width of a portion where the frame part (2) is overlapped with the design part (1).

$$(L_2/t_2) \geq 1.75 \qquad (1)$$

$$1 \geq (L_2/L_1) \geq 0.25 \qquad (2)$$

The reason why the ratio of the width $L_2$ of the thickness changing region of the inner peripheral portion (4) of the frame part (2) to the thickness $t_2$ of the frame part (2) ($L_2/t_2$) and the ratio of the width $L_2$ of the thickness changing region to the width $L_1$ of the frame part (2) ($L_2/L_1$) are controlled to the above respective ranges, is as follows. That is, if the width $L_2$ of the thickness changing region of the inner peripheral portion (4) is too small relative to the thickness $t_2$ of the frame part (2), influence of shrinkage of the frame part in the thickness direction tends to become too large, resulting in poor appearance of the obtained panel-shaped molded product. Also, if the width $L_2$ of the thickness changing region of the inner peripheral portion (4) is too small relative to the width $L_1$ of the frame part (2), the obtained panel-shaped molded product also tends to be deteriorated in appearance owing to a less region capable of absorbing influence of the shrinkage.

Meanwhile, the ratio of $L_2/t_2$ and the ratio of $L_2/L_1$ have such a relationship that respective influences thereof are mutually compensated with each other. That is, even if the width $L_2$ of the thickness changing region is not sufficiently larger than the thickness $t_2$ of the frame part (2), when the width $L_2$ of the thickness changing region is sufficiently larger than the width $L_1$ of the frame part (2), the influence of shrinkage of the frame part (2) can be reduced, so that the obtained panel-shaped molded product can exhibit a sufficiently good appearance. On the other hand, even if the width $L_2$ of the thickness changing region is not sufficiently larger than the width $L_1$ of the frame part (2), when the width $L_2$ of the thickness changing region is sufficiently larger than the thickness $t_2$ of the frame part (2), the thickness changing region can exhibit a good absorption property corresponding to shrinkage of the resins, so that the influence of shrinkage of the frame part (2) can be well absorbed, thereby fully achieving the effect of attaining a good appearance of the obtained panel-shaped molded product. Therefore, in the present invention, the ratio of the width $L_2$ of the thickness changing region to the thickness $t_2$ of the frame part (2) ($L_2/t_2$) and the ratio of the width $L_2$ of the thickness changing region to the width $L_1$ of the frame part (2) ($L_2/L_1$) may satisfy the relationship represented by the following formula (3).

$$(L_2/t_2) \times (L_2/L_1) \geq 0.4 \qquad (3)$$

In addition, in the present invention, when $\alpha_{AMD}$ denotes an average value of a linear expansion coefficient $\alpha_{ATD}$ in a flowing direction and a linear expansion coefficient $\alpha_{ATD}$ in a direction perpendicular to the flowing direction upon injection-molding the design part (1), and when $S_B$ denotes an average value of a molding shrinkage rate $S_{BMD}$ in a flowing direction and a molding shrinkage rate $S_{BTD}$ in a direction perpendicular to the flowing direction upon injection-molding the frame part (2), the ratio of the average value $\alpha_A$ of the linear expansion coefficients to the average value $S_B$ of the molding shrinkage rates ($\alpha_A/S_B$) is adjusted to lie within the range represented by the following formula (4).

$$0.8 \times 10^{-2} < (\alpha_A/S_B) < 2.3 \times 10^{-2} \, [/° \text{C.}] \qquad (4)$$

wherein the average value $\alpha_A$ of the linear expansion coefficients=$(\alpha_{AMD}+\alpha_{ATD})/2$; and the average value $S_B$ of the molding shrinkage rates=$(S_{BMD}+S_{BTD})/2$.

The reason why the ratio of the average value $\alpha_A$ of the linear expansion coefficients of the design part (1) to the average value $S_B$ of the molding shrinkage rates of the frame part (2) ($\alpha_A/S_B$) is adjusted to the above specified range, is as follows. That is, when the ratio ($\alpha_A/S_B$) is too small, convex warpage of the design part (1) (warpage of the panel-shaped molded product owing to a convexly curved surface of the design part (1) on the side where no frame part (2) is disposed) tends to be large, whereas when the ratio ($\alpha_A/S_B$) is too large, concave warpage of the design part (1) (warpage of the panel-shaped molded product owing to a convexly curved surface of the design part (1) on the side where the frame part (2) is disposed) tends to be large. In any of the cases, the resultant molded products are unsuitable for practical use.

Further, in the preferred embodiment of the present invention, the average value $\alpha_A$ of the linear expansion coefficients of the design part (1), and the ratio of the linear expansion coefficient $\alpha_{ATD}$ to the linear expansion coefficient $\alpha_{AMD}$ ($\alpha_{ATD}/\alpha_{AMD}$) of the design part (1) are adjusted to lie within the ranges represented by the following formulae (5) and (6), respectively.

$$2 \times 10^{-5} \leq \alpha_A \leq 7.5 \times 10^{-5} \, [/° \text{C.}] \qquad (5)$$

$$\alpha_{ATD}/\alpha_{AMD} < 2.0 \qquad (6)$$

The reason why the average value $\alpha_A$ of the linear expansion coefficients of the design part (1), and the ratio of the linear expansion coefficient $\alpha_{ATD}$ to the linear expansion coefficient $\alpha_{AMD}$ ($\alpha_{ATD}/\alpha_{AMD}$) of the design part (1) are adjusted to the above respective specific ranges, is as follows. That is, when the average value $\alpha_A$ of the linear expansion coefficients of the design part (1) is larger than $7.5 \times 10^{-5}$, the obtained product tends to suffer from considerable dimensional change depending upon temperature change, resulting in occurrence of defects such as distortions on the design part, and peeling and breakage of bonding or fitting portions. On the contrary, when the average value $\alpha_A$ of the linear expansion coefficients of the design part (1) is smaller than $2 \times 10^{-5}$, the resultant molded product tends to be deteriorated in transparency. On the other hand, when the ratio of the linear expansion coefficient $\alpha_{ATD}$ to the linear expansion coefficient $\alpha_{AMD}$ ($\alpha_{ATD}/\alpha_{AMD}$) is more than 2.0, the obtained molded product tends to suffer from large difference in dimensional change depending upon the direction thereof, resulting in occurrence of defects such as distortions on the design part, and peeling and breakage of connecting or fitting portions.

In addition, in the further preferred embodiment of the present invention, the average value $S_B$ of the molding shrinkage rates of the frame part (2), and a ratio of the molding shrinkage rate $S_{BTD}$ to the molding shrinkage rate $S_{BMD}$ ($S_{BTD}/S_{BMD}$) are adjusted to lie within the ranges represented by the following formulae (7) and (8), respectively, wherein the average value $S_B$ of the molding shrinkage rates of the frame part (2), and the ratio of the molding shrinkage rate $S_{BTD}$ to the molding shrinkage rate $S_{BMD}$ ($S_{BTD}/S_{BMD}$) are respectively values as measured with respect to a square flat plate having a size of 100 mm square and a thickness of 3.2 mm which is obtained by injection-molding a resin forming the frame part (2).

$$4.5 \times 10^{-3} \leq S_B \leq 7 \times 10^{-3} \quad (7)$$

$$S_{BTD}/S_{BMD} < 3 \quad (8)$$

The reason why the average value $S_B$ of the molding shrinkage rates of the frame part (2), and the ratio of the molding shrinkage rate $S_{BTD}$ to the molding shrinkage rate $S_{BMD}$ ($S_{BTD}/S_{BMD}$) are adjusted to the above specific ranges, respectively, is as follows. That is, when the average value $S_B$ of the molding shrinkage rates of the frame part (2) is larger than $7 \times 10^{-3}$, the influence of shrinkage of the frame part tends to be too large. As a result, even if the thickness changing region is provided in the frame part, the design part tends to suffer from formation of recesses on the surface thereof. Further, convex warpage of the design part (1) tends to be too large, so that the obtained molded product tends to be unsuitable for practical use. On the contrary, when the average value $S_B$ of the molding shrinkage rates of the frame part (2) is smaller than $4.5 \times 10^{-3}$, concave warpage of the design part (1) tends to be too large, so that the obtained molded product also tends to be unsuitable for practical use. When the ratio of the molding shrinkage rate $S_{BTD}$ to the molding shrinkage rate $S_{BMD}$ ($S_{BTD}/S_{BMD}$) is more than 3, shrinkage of the frame part tends to occur in a specific direction thereof, so that the obtained panel-shaped molded product tends to be undesirably twisted.

Meanwhile, in the panel-shaped molded product of the present invention, the design part (1) may have a smaller thickness only at a portion thereof where the design part (1) is lined with the frame part (2). In other words, the frame part (2) may be welded so as to engage with the outer peripheral side of one surface of the design part (1). Further, the inner peripheral portion (4) of the frame part (2) may be provided in the thickness changing region thereof with reinforcing ribs.

Also, in the panel-shaped molded product of the present invention, in order to mainly prevent damage and deterioration of the design part (1), a hard coating layer (a hard coating layer (hard film) is represented by reference numeral (7) in FIGS. 6 to 9) may be provided thereon as a protective film. Such a hard coating layer may be disposed on a front surface of the design part (1), i.e., on its surface opposite to the frame part (2). In addition, a transparent resin layer may also be provided between the surface of the design part (1) and the hard coating layer. When the transparent resin layer and the hard coating layer are successively disposed on the surface of the design part (1), it is possible to enhance the effect of preventing the design part (1) from suffering from cracks. The hard coating layer and the transparent resin layer are described in detail hereinafter.

Next, the second embodiment of the present invention is described. The panel-shaped molded product of the present invention is modularized with a molded panel having an opening for window. The thus modularized molded panel is used as a part for vehicles such as automobiles and trains, ships, and buildings. Most typical examples of these parts include side doors, back doors, slide doors, hoods and roofs for automobiles with windows, and similar parts thereof.

Figure 4:
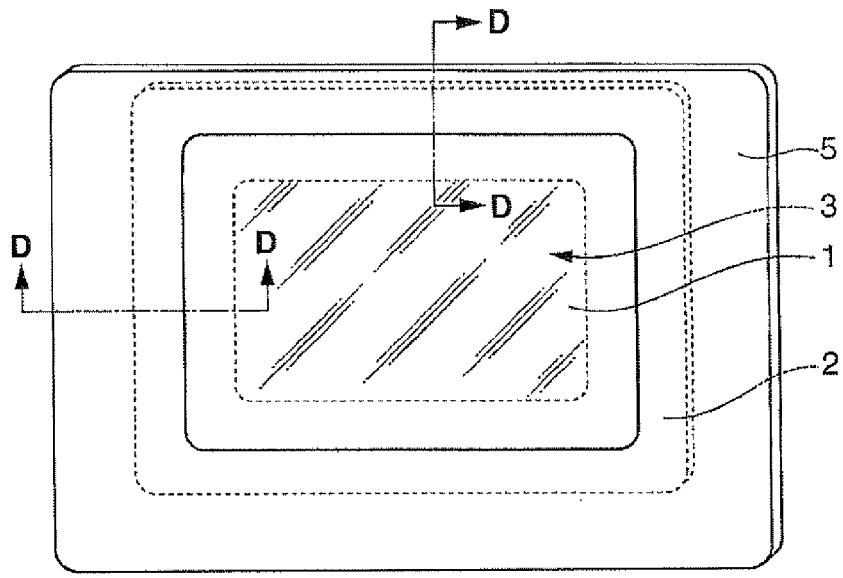
FIG. 4 is perspective views each showing an appearance of an example of the panel-shaped molded product integrated with a molded panel having an opening for window when viewed from a front side and a rear side thereof.
Figure 4:
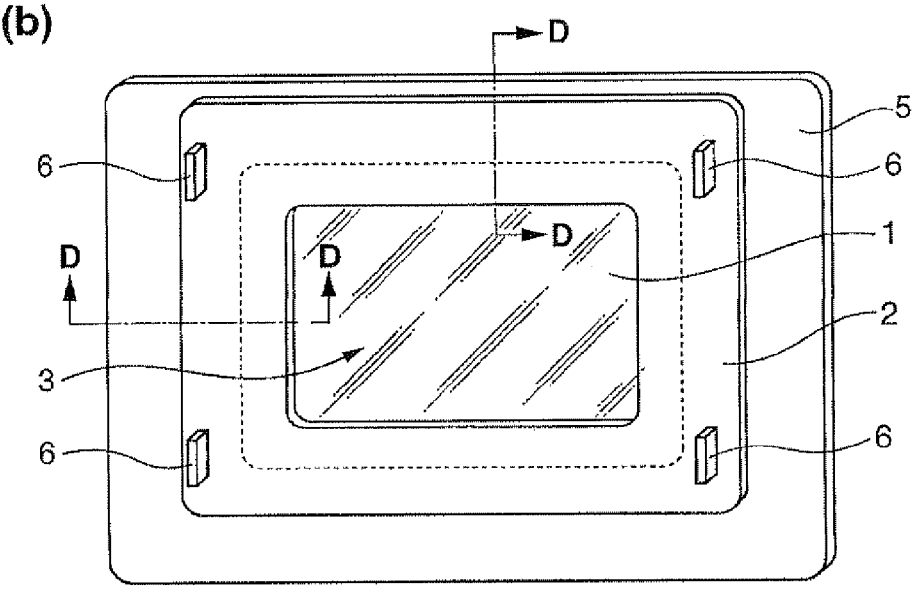

More specifically, as shown in FIG. 4, the panel-shaped molded product of the present invention is integrated with a molded panel (5) having an opening for window. The design part (1) as a window glass which is produced from a transparent resin is fitted to the opening of the molded panel (5), and the frame part (2) as a window frame is positioned on the side of one surface of the molded panel (5) (inner side as shown in FIG. 4(b)). On an opposite surface of the molded panel including the surface of the design part (1) (front side of the condition as shown in FIG. 4(a)), there is disposed a hard coating layer (7) (refer to FIGS. 6 and 7).

The molded panel (5) is a resin member, and may be formed into a desired shape, for example, corresponding to side doors, back doors, slide doors, hoods, roofs, etc., when applied to parts of automobiles. The molded panel (5) may be usually produced from an opaque resin. The thickness of the molded panel (5) varies depending upon materials used therefor and applied portions, and is usually about 1 to 10 mm. The molded panel (5) is provided with an opening constituting a window. Such an opening of the molded panel (5) may be designed into various shapes according to applied portions, aimed applications, etc., and may be formed, for example, into a square shape as illustrated in the figures.

The basic structure of each of the design part (1) and the frame part (2) in the second embodiment is the same as described in the previous embodiment. As shown in FIGS. 4(b) and 5(b), on the surface of the frame part (2) which is opposite to the surface where the design part (1) is disposed, i.e., the surface of the frame part (2) facing to a compartment when applied to automobiles, there are usually provided fitting pieces as projections for fitting other parts such as interior parts thereto. Such fitting pieces may be provided in the inner peripheral portion (4) of the frame part (2) as described hereinlater.

The hard coating layer (7) (refer to FIGS. 6 and 7) serves as a protective film for mainly preventing the surfaces of the molded panel (5) and the design part (1) from being damaged or deteriorated, and disposed on the opposite surface of the molded panel (5) including the surface of the design part (1), i.e., on the surface as shown in FIG. 4(a) which is opposite to the surface where the frame part (2) is provided. The hard coating layer (7) is produced from a transparent resin so as not to adversely affect a color tone of the molded panel (5) and a transparency of the design part (1). Meanwhile, illustration of the hard coating layer (7) is omitted in FIGS. 4 and 5.

The hard coating layer (7) may have a single-layer structure but preferably has a multilayer structure with at least two layers for enhancing a protective function thereof. In the case where the hard coating layer has a multilayer structure, it is preferred that an outermost layer in the multilayer structure has a highest hardness. The hard coating layer (7) having such a multilayer structure is preferably provided with various functional layers or primer layers to impart thereto, for example, at least one function selected from the group consisting of heat ray shielding, ultraviolet absorption, thermochromism, photochromism and electrochromism. Also, although not shown in the figures, from the viewpoint of enhancing a protective function for the molded panel (5) and the design part (1), the same hard coating layer is preferably provided on the side of one surface of the molded panel (5) including the surface of the design part (1), i.e., on the surface facing to the frame part (2).

Further, although not shown in the figures, a transparent resin layer may be disposed between the hard coating layer (7), and the molded panel (5) and the design part (1). With the provision of such a transparent resin layer, it is possible to enhance adhesion between the molded panel (5) and the design part (1). In addition, when the hard coating layer (7) is provided on the molded panel (5) and the design part (1) through the transparent resin layer, it is possible to prevent occurrence of cracks owing to distortions on the molded panel (5) and the design part (1) as well as intrusion of raw materials of the hard coating layer (7) into gaps between the molded panel (5) and the design part (1).

Figure 9:
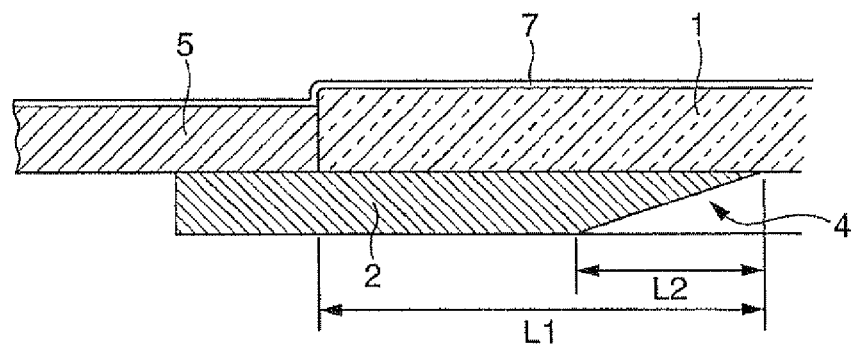
FIG. 9 is a cross-sectional view showing the other example of a connecting structure between the molded panel, the design part and the frame part in the panel-shaped molded product.

Meanwhile, as shown in FIG. 6(a), when comparing the thickness of the molded panel (5) with that of the design part (1), the design part (1) is usually designed to have a larger thickness than that of the molded panel (5) as described above. In this case, from the viewpoint of a good design property, as shown in FIG. 6(a), the front surface of the design part (1) may be disposed in the same plane as aligned with the surface of the molded panel (5). Alternatively, as shown in FIG. 9, the front surface of the design part (1) may be projected outwardly from the surface of the molded panel (5) by the difference in thickness therebetween.

Figure 6:
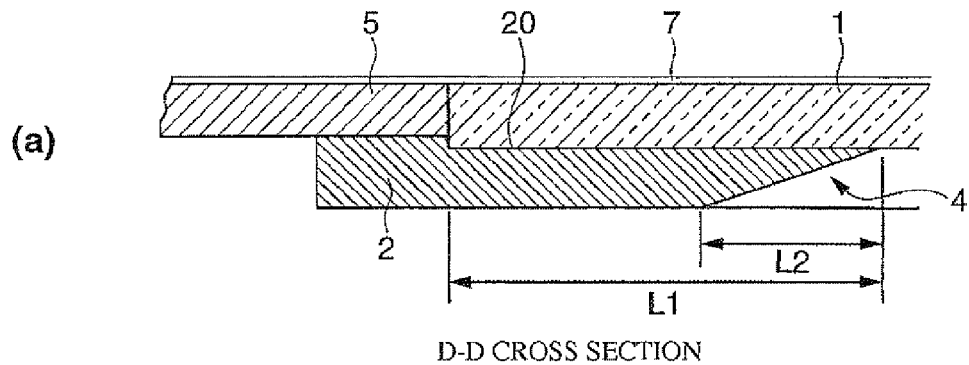
FIG. 6 is cross-sectional views each showing an example of a connecting structure between the molded panel, the design part and the frame part in the panel-shaped molded products shown in FIGS. 4 and 5, which are partially broken away and taken along the line D-D of each of FIGS. 4 and 5.
Figure 6:
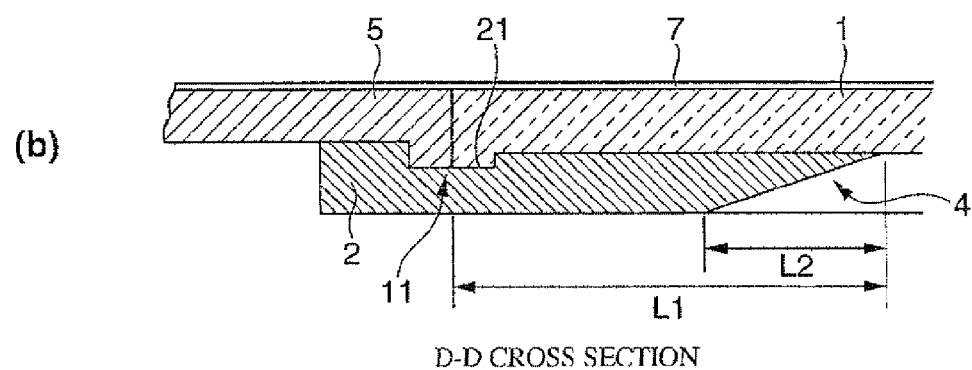
Figure 6:
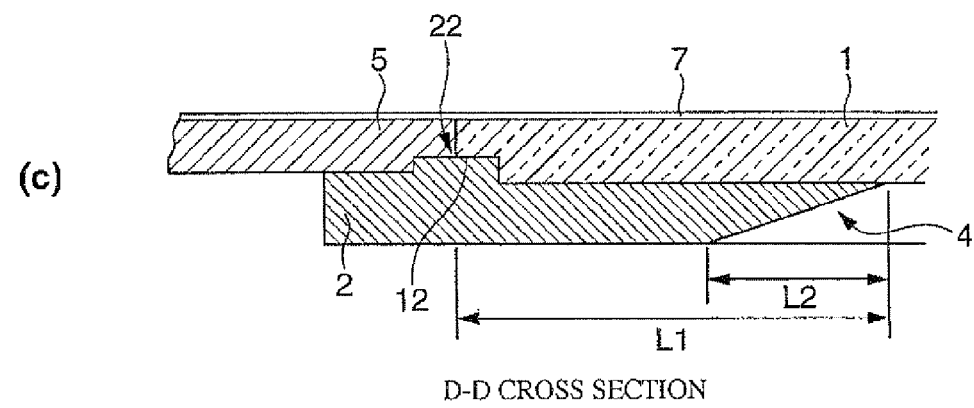
Figure 7:
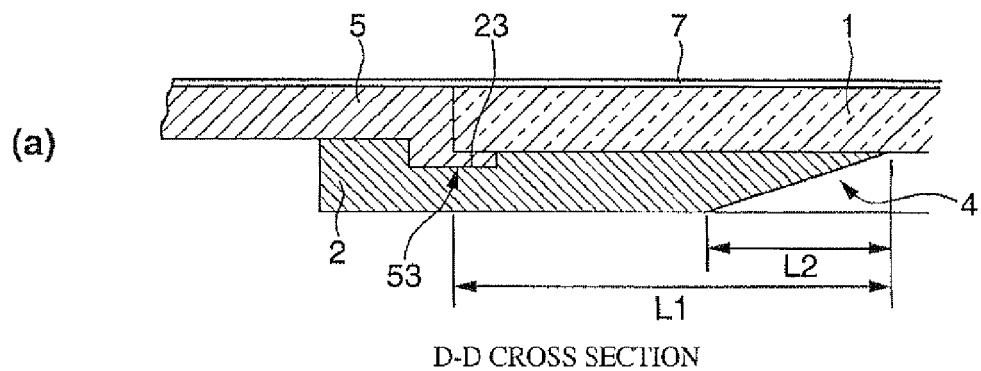
FIG. 7 is cross-sectional views each showing an example of a connecting structure between the molded panel, the design part and the frame part in the panel-shaped molded products shown in FIGS. 4 and 5, which are partially broken away and taken along the line D-D of each of FIGS. 4 and 5.
Figure 7:
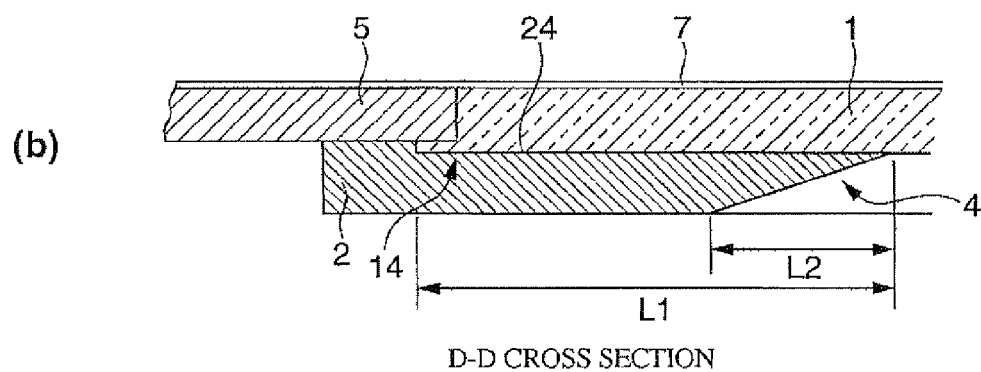

When the surface of the design part (1) is disposed in the same plane as aligned with the front surface of the molded panel (5), the cross-sectional shape of the frame part (2) along the thickness direction of the panel-shaped molded product (shape of cross-section in the direction perpendicular to the vertical and lateral elongation directions of the frame part) is formed with a stepped portion (20) on its surface facing to the side of the design part (1) located along the inner peripheral portion of the frame part as shown in FIG. 6. The retreated depth of the stepped portion (20) (size of the step) is so designed as to correspond to the difference in thickness between the molded panel (5) and the design part (1). On the other hand, as shown in FIG. 9, when the front surface of the design part (1) is projected outwardly from the surface of the molded panel (5) by the difference in thickness therebetween, the cross-section of the frame part (2) along the thickness direction of the panel-shaped molded product is usually formed into a flat shape on the side facing to the molded panel (5) and the design part (1) in the inner peripheral portion of the frame part.

Figure 5:
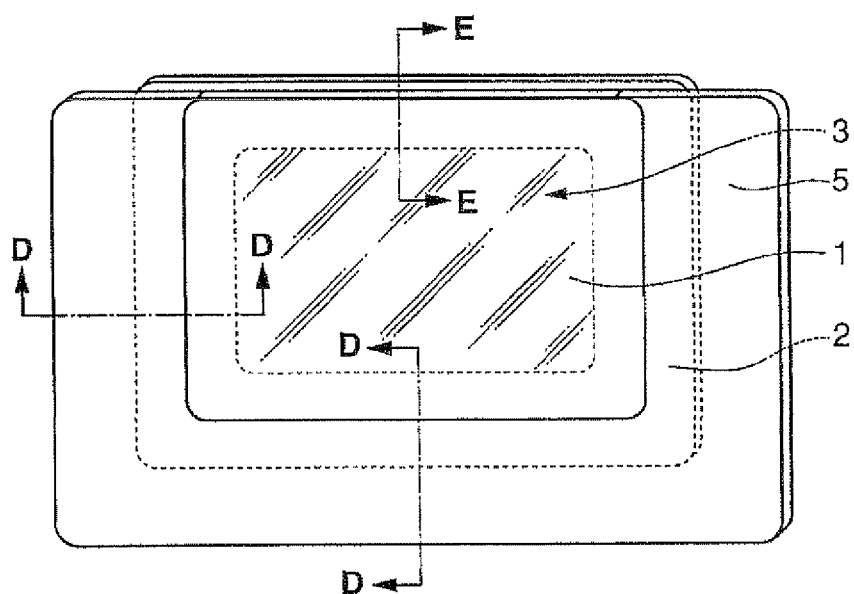
FIG. 5 is perspective views each showing an appearance of the other example of the panel-shaped molded product integrated with a molded panel having an opening for window when viewed from a front side and a rear side thereof.
Figure 5:
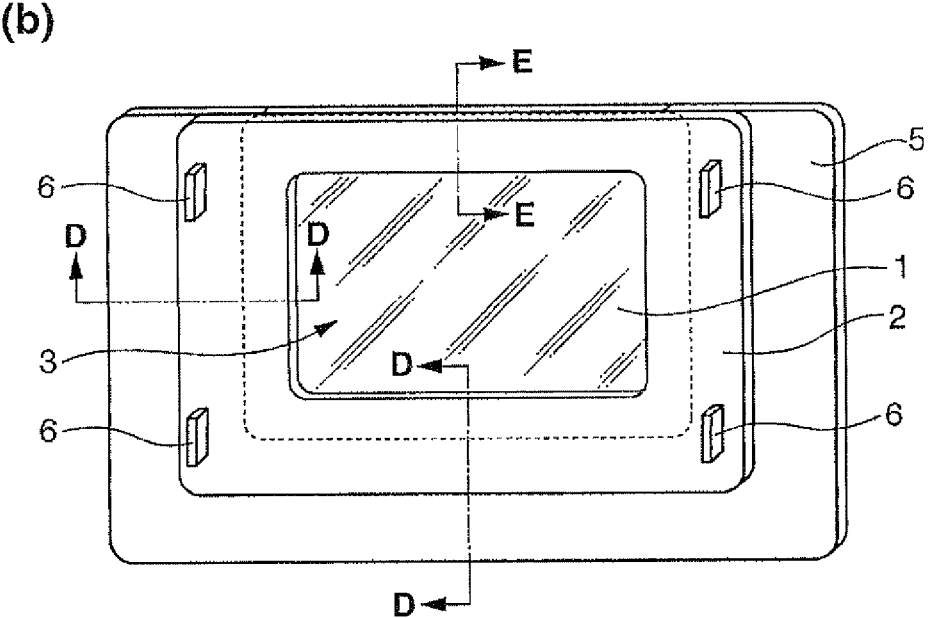

In the present invention, the frame part (2) may be disposed to surround an entire outer peripheral portion of the design part (1). The entire outer peripheral portion of the design part (1) may also be surrounded by the molded panel (5) as shown in FIG. 4. Alternatively, only a part of the outer peripheral portion of the design part (1) may be surrounded by the molded panel (5) as shown in FIG. 5. More specifically, in the modularized panel-shaped molded product as shown in FIG. 4, the design part (1) is disposed in a closed opening formed in an approximately central portion of the molded panel (5). On the other hand, in the modularized panel-shaped molded product as shown in FIG. 5, the design part (1) is disposed in the opening partially cutout at a position offset to one peripheral end of the molded panel (5). In any of the above cases, the design part (1) is fixedly attached to the opening of the molded panel (5) surrounding the design part, and thereby integrated with the molded panel (5).

In the present invention, in order to enhance bonding strength between the design part (1) and the molded panel (5), the frame part (2) is disposed to span between the outer peripheral portion of the design part (1) and the inner peripheral portion of the molded panel (5) along the opening thereof, and is integrated with the molded panel (5). In the present invention, with the above arrangement, it is possible to realize reduction in weight of the respective members and ensure a sufficient strength capable of withstanding upon practical use.

Further, in the preferred embodiment of the present invention, in order to further enhance bonding strength between the molded panel (5), the design part (1) and the frame part (2), as shown in FIGS. 6(b) and 6(c), the connecting portion between the outer peripheral portion of the design part and the inner peripheral portion of the molded panel along the opening thereof has an engaging structure when viewed along a cross-sectional thickness direction thereof. The engaging structure is specifically explained by referring to an exemplary case where the surface of the design part (1) is disposed in the same plane as the front surface of the molded panel (5) owing to the relationship between thicknesses of the molded panel (5) and the design part (1). The engaging structure includes the following two configurations.

More specifically, in the first configuration of the engaging structure, as shown in FIG. 6(b), the connecting portion between the outer peripheral portion of the design part (1) and the inner peripheral portion of the molded panel (5) along the opening thereof is provided with a projection (11) on the side facing to the frame part (2), and the projection (11) is engaged with a groove (21) formed on the frame part (2). In the engaging structure as shown in FIG. 6(b), the groove (21) of the frame part (2) is capable of preventing the molded panel (5) and the design part (1) from being displaced from each other in the plane direction, and increasing a fixing area of the frame part (2) against the molded panel (5) and the design part (1) and, therefore, can enhance a bonding strength between the molded panel (5) and the design part (1).

In the second configuration of the engaging structure, as shown in FIG. 6(c), the connecting portion between the outer peripheral portion of the design part (1) and the inner peripheral portion of the molded panel (5) along the opening thereof is provided with a groove (12) on the side facing to the frame part (2), and the groove (12) is engaged with a projection (22) formed on the frame part (2). In the engaging structure as shown in FIG. 6(c), the projection (22) of the frame part (2) is capable of increasing a fixing area of the frame part (2) against the molded panel (5) and the design part (1) and, therefore, can enhance a bonding strength between the molded panel (5) and the design part (1).

Also, according to the other preferred embodiment of the present invention, in the modularized panel-shaped molded product as shown in FIG. 7(a), the inner peripheral portion of the molded panel (5) along the opening thereof has an engaging structure capable of engaging with the frame part (2) when viewed along a cross-sectional thickness direction thereof. More specifically, in such an engaging structure, the inner peripheral portion of the molded panel (5) along the opening thereof has a projection (53) projected toward the side of frame part (2) and bent to cover the outer peripheral portion of the design part (1), and the projection (53) is engaged with a groove (23) formed on the frame part (2). In The engaging structure as shown in FIG. 7(a), the groove (23) formed on the frame part (2) is capable of restraining the projection (53) of the molded panel (5) and preventing the opening of the molded panel (5) to be deformed in its expanding direction, thereby maintaining a high bonding strength between the molded panel (5) and the design part (I).

In the still other preferred embodiment of the present invention, as shown in FIG. 7(b), the outer peripheral portion of the design part (1) has an engaging structure capable of engaging with the frame part (2) when viewed in a cross-sectional thickness direction thereof. More specifically, in the engaging structure, the outer peripheral portion of the design part (1) on the side facing to the frame part (2) has a projection (14) that is projected outwardly along the plane direction of the design part to cover the inner peripheral portion of the molded panel (5) along the opening thereof, and the outer peripheral portion of the design part (1) including the projection (14) is engaged with a thin stepped portion (24) formed on the side of the inner peripheral portion of the frame part (2). In the engaging structure as shown in FIG. 7(b), with the provision of the projection (14) of the design part (1), it is possible to not only increase a fixing area of the design part (1) to the inner peripheral portion of the molded panel (5) along the opening thereof but also increase a fixing area of the design part (1) to the frame part (2), thereby enhancing a bonding strength between the molded panel (5) and the design part (1).

Figure 8:
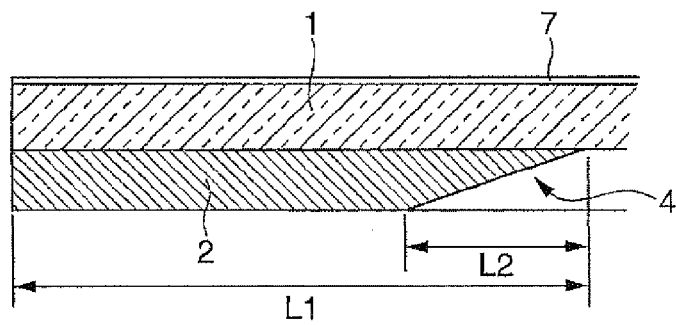
FIG. 8 is a cross-sectional view showing an example of a connecting structure between the design part and the frame part in the other embodiment of the panel-shaped molded products shown in FIG. 5, which is partially broken away and taken along the line E-E of FIG. 5.

Meanwhile, in the modularized panel-shaped molded product as shown in FIG. 5, i.e., in the panel-shaped molded product in which the design part (1) is disposed in the partially cutout opening of the molded panel (5), the design part (1) located in the cutout opening is fixed only to the frame part (2) as shown in FIG. 8. In such a case, the connecting structure between the design part (1) and the frame part (2) may be an integrated structure obtained by fixing flat surfaces thereof to each other as shown in FIG. 8, or an integrated structure obtained by using the above-described various engaging structures.

Also, in the above embodiment as shown in FIG. 9, i.e., in the embodiment in which the front surface of the design part is projected outwardly from the surface of the molded panel (5) by the difference in thickness therebetween, there can be adopted various engaging structures between the molded panel (5), the design part (1) and the frame part (2) as described above. By using such engaging structures, the molded panel (5), the design part (1) and the frame part (2) can be more strongly integrated together.

Constituting materials used in the present invention may be selected so as to satisfy the above respective conditions. In the followings, the materials constituting the panel-shaped molded product and the modularized panel-shaped molded product of the present invention are explained.

First, the material constituting the design part (1) is explained. The material constituting the design part (1) may be appropriately selected from conventionally known optional transparent resins. The term "transparent" resin as used herein means that a plate-shaped molded product having a flat surface and a thickness of 3 mm which is produced from the resin has a total light transmittance of usually not less than 10%, preferably not less than 20% and more preferably not less than 30% as measured according to JIS K7105. In the case of the transparent resin comprising a dye or pigment, the content of the dye or pigment used therein is usually 0.001 to 2 parts by weight, preferably 0.005 to 120 parts by weight and more preferably 0.005 to 0.5 part by weight based on 100 parts by weight of the thermoplastic resin.

Examples of the transparent resin include polystyrene resins, high-impact polystyrene resins, hydrogenated polystyrene resins, polyacrylic styrene resins, ABS resins, AS resins, AES resins, ASA resins, SMA resins, polyalkyl methacrylate resins, polymethacrylic methacrylate resins, polyphenyl ether resins, polycarbonate resins, non-crystalline polyalkylene terephthalate resins, polyester resins, non-crystalline polyamide resins, poly-4-methyl pentene-1, cyclic polyolefin resins, non-crystalline polyarylate resins, polyether sulfones, and thermoplastic elastomers such as styrene-based thermoplastic elastomers, olefin-based thermoplastic elastomers, polyamide-based thermoplastic elastomers, polyester-based thermoplastic elastomers and polyurethane-based thermoplastic elastomers. Among these resins, from the viewpoints of a good impact resistance and a good heat resistance, preferred are polycarbonate (PC) resins, and more preferred are those resins comprising an aromatic polycarbonate resin as a main constituting resin. The "resins comprising an aromatic polycarbonate resin as a main constituting resin" means that the resins comprise the aromatic polycarbonate resin in an amount of usually not less than 50% by weight, preferably not less than 60% by weight and more preferably not less than 70% by weight.

Examples of the resins that are usable in combination with PC as the main constituting resin include polystyrene resins, ABS resins, AS resins, AES resins, ASA resins, polyphenylene ether resins, polymethacrylic methacrylate resins and polyester resins. These resins may be in the form of either an alloy or a copolymer as long as they have a good transparency.

The PC used in the present invention is a linear or branched thermoplastic polymer or copolymer which is obtained, for example, by reacting an aromatic dihydroxy compound and a carbonate precursor, or by reacting these compounds with a small amount of a polyhydroxy compound, etc. The PC may be produced by conventionally known methods. Examples of the methods for production of the PC include an interfacial polymerization method, a melting transesterification method, a pyridine method, a ring-opening polymerization method of cyclic carbonate compounds, and a solid-state transesterification method of prepolymers.

Examples of the aromatic dihydroxy compound used as a raw material of the PC include bis(hydroxyaryl)alkanes such as 2,2-bis(4-hydroxyphenyl)propane (alias: bisphenol A), 2,2-bis(3,5-bibromo-4-hydroxyphenyl)propane (alias: tetrabromobisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-tert-butyl-4-hydroxyphenyl)propane, 2,2-bis(4-hydroxy-3,5-dimethylphenyl)propane, 2,2-bis(3-bromo-4-hydroxyphenyl)propane, 2,2-bis(3,5-dichloro-4-hydroxyphenyl)propane, 2,2-bis(3-phenyl-4-hydroxyphenyl)propane, 2,2-bis(3-cyclohexyl-4-hydroxyphenyl)propane, 1,1-bis(4-hydroxyphenyl)-1-phenylethane, bis(4-hydroxyphenyl)diphenylmethane, 2,2-bis(4-hydroxyphenyl)-1,1,1-trichloropropane, 2,2-bis(4-hydroxyphenyl)-1,1,1,3,3,3-hexachloropropane and 2,2-bis(4-hydroxyphenyl)-1,1,1,3,3,3-hexafluoropropane; bis(hydroxyaryl)cycloalkanes such as 1,1-bis(4-hydroxyphenyl cyclopentane, 1,1-bis(4-hydroxyphenyl)cyclohexane and 1,1-bis(4-hydroxyphenyl)-3,3,5-trimethylcyclohexane; bisphenols having a cardo structure such as 9,9-bis(4-hydroxyphenyl)fluorene and 9,9-bis(4-hydroxy-3-methylphenyl)fluorene; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; hydroquinone; resorcin; and 4,4'-dihydroxydiphenyl.

Among the above aromatic dihydroxy compounds, preferred are bis(4-hydroxyphenyl)alkanes, and more preferred is 2,2-bis(4-hydroxyphenyl)propane [alias: bisphenol A] from the viewpoint of a good impact resistance of the resultant PC. These aromatic dihydroxy compounds may be used in combination of any two or more thereof.

Examples of the carbonate precursor to be reacted with the aromatic dihydroxy compound include carbonyl halides, carbonic acid esters and haloformates. Specific examples of the carbonate precursor include phosgene; diaryl carbonates such as diphenyl carbonate and ditolyl carbonate; dialkyl carbonates such as dimethyl carbonate and diethyl carbonate; and dihaloformates of dihydric phenols. These carbonate precursors may also be used in combination of any two or more thereof.

Also, the PC used in the present invention may be in the form of a branched aromatic polycarbonate resin obtained by copolymerizing a tri- or more polyfunctional aromatic compound with PC. Examples of the tri- or more polyfunctional aromatic compound include polyhydroxy compounds such as fluoroglucin, 4,6-dimethyl-2,4,6-tri(4-hydroxyphenyl)heptene-2,4,6-dimethyl-2,4,6-tri(4-hydroxyphenyl)heptane, 2,6-dimethyl-2,4,6-tri(4-hydroxyphenyl)heptene-3,1,3,5-tri(4-hydroxyphenyl)benzene and 1,1,1-tri(4-hydroxyphenyl)ethane; 3,3-bis(4-hydroxyaryl)oxyindole (alias: isatin bisphenol); 5-chloroisatin; 5,7-dichloroisatin; and 5-bromoisatin. Among these polyfunctional aromatic compounds, preferred is 1,1,1-tri(4-hydroxyphenyl)ethane. The polyfunctional aromatic compound may be used by replacing a part of the above aromatic dihydroxy compound therewith. The amount of the polyhydroxy aromatic compound used is usually 0.01 to 10 mol % and preferably 0.1 to 2 mol % on the basis of the aromatic dihydroxy compound.

The molecular weight of the PC used in the present invention may be optionally determined, and is controlled such that the viscosity-average molecular weight [Mv] calculated from a solution viscosity thereof is usually in the range of 10,000 to 50,000. The PC having a viscosity-average molecular weight of not less than 10,000 tends to be improved in mechanical strength, and can be therefore suitably used in the applications requiring a higher mechanical strength. Whereas, the PC having a viscosity-average molecular weight of not more than 50,000 tends to exhibit a low fluidity, resulting in facilitated molding process thereof. Meanwhile, the viscosity-average molecular weight of the PC is preferably 12,000 to 40,000 and more preferably 14,000 to 30,000. Also, two or more kinds of PC resins that are different in viscosity-average molecular weight from each other may be used in the form of a mixture thereof.

The viscosity-average molecular weight [Mv] as used in the present invention means the value calculated from an intrinsic viscosity [η] (unit: dL/g) as measured at 20° C. in methylene chloride as a solvent using an Ubbellohde viscometer, according to Schnell's viscosity formula (i.e., η=1.23×10$^{-4}$M$^{0.83}$). The intrinsic viscosity [η] is the value calculated from a specific viscosity [η$_{sp}$] as measured at each solution concentration [C] (g/dL) according to the following formula:

$$\eta = \lim_{c \to 0} \eta_{sp}/C.$$

The end hydroxyl group concentration of the PC used in the present invention is usually not more than 1000 ppm, preferably not more than 800 ppm and more preferably not more than 600 ppm. The lower limit of the end hydroxyl group concentration of the PC, in particular, PC produced by transesterification method, is usually not less than 10 ppm, preferably not less than 30 ppm and more preferably not less than 40 ppm.

When the end hydroxyl group concentration of the PC is controlled to not less than 10 ppm, the PC is prevented from undergoing reduction in a molecular weight thereof, resulting in such a tendency that the obtained resin composition is further enhanced in mechanical properties. Also, when the end hydroxyl group concentration of the PC is controlled to not more than 1000 ppm, the obtained resin composition tends to be further enhanced in retention thermal stability and color tone. Meanwhile, the unit of the above end hydroxyl group concentration expressed by "ppm" represents a weight of the end hydroxyl group based on the weight of the PC. The end hydroxyl group concentration may be measured by colorimetric quantity determination using a titanium tetrachloride/acetic acid method (the method described in "Macromol. Chem.", 88, 215 (1965)).

In addition, the PC used in the present invention may also comprise an aromatic polycarbonate oligomer in order to improve an appearance of a molded product obtained therefrom as well as a fluidity of the resin composition. The viscosity-average molecular weight [Mv] of the aromatic polycarbonate oligomer is usually 1,500 to 9,500 and preferably 2,000 to 9,000. The aromatic polycarbonate oligomer is usually used in an amount of not more than 30% by weight based on the weight of the PC.

Further, in the present invention, as the PC, there may also be used not only the virgin PC, but also those PC resins regenerated from used resin products, i.e., so-called material-recycled PC resins. Examples of the used resin products include optical recording media such as optical discs, light guide plates, transparent members for vehicles such as automobile window glass, automobile headlamp lenses and windshields, containers such as water bottles, spectacle lenses, and building materials such as sound insulating walls, glass windows and corrugated sheets. Further, there may also be used nonconforming products and crushed or pulverized products obtained from sprues and runners as well as pellets obtained by melting these products. The amount of the regenerated PC used is usually not more than 80% by weight and preferably not more than 50% by weight based on the weight of the virgin PC.

The constituting material of the design part (1) may also comprise, in addition to the above-described dye or pigment, conventionally known optional assistants. Examples of the assistants include releasing agents, heat stabilizers, antioxidants, weathering modifiers, alkali soaps, metal soaps, plasticizers, fluidity modifiers, nucleating agents, flame retardants and anti-dripping agents. The amount of these assistants used may be appropriately selected from the known ranges.

Next, the constituting material of the frame part (2) as well as the constituting material of the molded panel (5) used in the second embodiment are explained. The constituting materials of the frame part (2) and the molded panel (5) are not particularly limited, and there may be used various known optional thermoplastic resins. Specific examples of the thermoplastic resins include polycarbonate resins; thermoplastic polyester resins such as polyethylene terephthalate resin, polytrimethylene terephthalate resin and polybutylene terephthalate resin; styrene-based resins such as polystyrene resins, high-impact polystyrene resins (HIPS), acrylonitrile-styrene copolymers (AS resins), acrylonitrile-butadiene-styrene copolymers (ABS resins), acrylonitrile-styrene-acrylic rubber copolymers (ASA resins) and acrylonitrile-ethylene/propylene-based rubber-styrene copolymers (AES resins); polyolefin resins such as polyethylene resins and polypropylene resins; polyamide resins; polyimide resins; polyether imide resins; polyurethane resins; polyphenylene ether resins; polyphenylene sulfide resins; polysulfone resins; and polymethacrylate resins. These thermoplastic resins may be used in combination of any two or more thereof. Among these thermoplastic resins, from the viewpoints of a good thermal stability, a good rigidity and good adhesion to the design part (1), preferred are PC and thermoplastic polyester resins, and more preferred are those resins comprising PC as a main material, in particular, combination of PC and the thermoplastic polyester resins.

When using a polymer alloy of PC and the thermoplastic polyester resin as the constituting materials of the frame part (2) and the molded panel (5), the content of PC in the polymer alloy is usually 10 to 90% by weight based on a total weight of both the components.

The above thermoplastic polyester resins are in the form of a polymer or copolymer obtained by subjecting a dicarboxylic acid component comprising a dicarboxylic acid or a reactive derivative thereof and a diol component comprising a diol or an ester derivative thereof to condensation reaction.

The above thermoplastic polyester resin may be generally produced by reacting the dicarboxylic acid component and the diol component with each other in the presence of a polycondensation catalyst comprising titanium, germanium, antimony, etc., while discharging water and lower alcohols as by-products from the reaction system. Meanwhile, the condensation reaction may be conducted by either a batch method or a continuous method. Further, the resultant polymer or copolymer may be subjected to solid-state polymerization in order to increase a polymerization degree thereof.

The dicarboxylic acid may be either an aromatic dicarboxylic acid or an aliphatic dicarboxylic acid. Among them, the aromatic dicarboxylic acid is preferred from the viewpoints of a good heat resistance and a good dimensional stability. Specific examples of the aromatic dicarboxylic acid include terephthalic acid, isophthalic acid, orthophthalic acid, 1,5-naphthalene dicarboxylic acid, 2,6-naphthalene dicarboxylic acid, 4,4'-biphenyl dicarboxylic acid, 4,4'-biphenylether dicarboxylic acid, 4,4'-biphenylmethane dicarboxylic acid, 4,4'-biphenylsulfone dicarboxylic acid, 4,4'-biphenylisopropylidene dicarboxylic acid, 1,2-bis(phenoxy) ethane-4,4'-dicarboxylic acid, 2,5-anthracene dicarboxylic acid, 2,6-anthracene dicarboxylic acid, 4,4'-p-terphenylene dicarboxylic acid and 2,5-pyridine dicarboxylic acid. In addition, there may also be used alkyl-substituted products of these acids such as 5-methyl isophthalic acid as well as reactive derivatives of these acids, for example, alkyl ester derivatives such as dimethyl terephthalate and diethyl terephthalate.

Among these compounds, more preferred are terephthalic acid, 2,6-naphthalene dicarboxylic acid and alkyl ester derivatives thereof, and still more preferred are terephthalic acid and alkyl ester derivatives thereof. These aromatic dicarboxylic acids may be used in combination of any two or more thereof. These aromatic dicarboxylic acids may also be used in combination with aliphatic dicarboxylic acids such as adipic acid, azelaic acid, sebacic acid and dodecanedioic acid, and alicyclic dicarboxylic acid such as cyclohexanedicarboxylic acid.

Specific examples of the diol include aliphatic diols such as ethylene glycol, 1,2-propylene glycol, 1,3-propanediol, 1,4-butanediol, neopentyl glycol, 1,5-pentanediol, 1,6-hexanediol, decamethylene glycol and 2,2-dimethyl-1,3-propanediol; alicyclic diols such as 1,4-cyclohexanedimethanol, 1,3-cyclohexanedimethanol, cyclohexanediol and trans- or cis-2,2,4,4-tetramethyl-1,3-cyclobutanediol; aromatic diols such as p-xylylenediol, bisphenol A, tetrabromobisphenol A and tetrabromobisphenol A-bis(2-hydroxyethyl ether); and substituted products thereof.

Among these diols, from the viewpoints of good thermal stability, impact resistance, rigidity, etc., preferred are ethylene glycol, 1,3-propanediol, 1,4-butanediol and 1,4-cyclohexanedimethanol, more preferred are ethylene glycol, 1,3-propanediol and 1,4-butanediol, and still more preferred is ethylene glycol. These diols may be used in combination of any two or more thereof. Further, as the diol component, the above diols may be used in combination with one or more kinds of long-chain diols having a molecular weight of 400 to 6,000 such as polyethylene glycol, poly-1,3-propylene glycol and polytetramethylene glycol, and both may be copolymerized with the dicarboxylic acid component.

In addition, the thermoplastic polyester resin used in the present invention may have a branched structure by introducing a small amount of a branching agent thereinto. Examples of the branching agent include trimesic acid, trimelittic acid, trimethylol ethane, trimethylol propane and pentaerythritol.

Specific examples of the suitable thermoplastic polyester resin used in the present invention include polyethylene terephthalate resin (PET), polypropylene terephthalate resin (PPT), polybutylene terephthalate resin (PBT), polyhexylene terephthalate resin, polyethylene naphthalate resin (PEN), polybutylene naphthalate resin (PEBN), poly(1,4-cyclohexanedimethylene terephthalate) resin (PCT) and polycyclohexylcyclohexylate (PCC). Among these thermoplastic polyester resins, polyethylene terephthalate resin (PET), polypropylene terephthalate resin (PPT) and polybutylene terephthalate resin (PBT) are preferred from the viewpoints of good fluidity and impact resistance.

The above polyethylene terephthalate resin is in the form of a saturated polyester polymer or copolymer obtained by subjecting a dicarboxylic acid component comprising terephthalic acid as a main component and a diol component comprising ethylene glycol as a main component to condensation reaction. The content of an ethylene terephthalate unit as a repeating unit in the polyethylene terephthalate resin is usually not less than 70 mol % and preferably not less than 80 mol %. Also, the polyethylene terephthalate resin may comprise diethylene glycol produced by a side reaction upon the polymerization as a comonomer component. The content of the diethylene glycol comonomer in the polyethylene terephthalate resin is usually 0.5 to 6 mol % and preferably 0.5 to 5 mol % based on a total amount of the diol component used in the polymerization reaction.

Specific examples of the other thermoplastic polyester resin include polypivalolactone resins and poly(δ-caprolactone) resins obtained by ring-opening polymerization of lactones, and liquid crystal polymers capable of forming a liquid crystal in a melted state (Thermotropic Liquid Crystal Polymer: TLCP). Specific examples of commercially available products of the liquid crystal polyester resins include "X7G" produced by Eastman Kodak Co., "Xyday" produced by Dartoco Corp., "Econol" produced by Sumitomo Chemical Corp., and "Vectra" produced by Ceraneed Corp.

The thermoplastic polyester resin used in the present invention preferably has an intrinsic viscosity of 0.4 to 1.5 dL/g and more preferably 0.5 to 1.3 dL/g. The intrinsic viscosity as used herein is the value as measured at 30° C. in a solvent comprising phenol and tetrachloroethane at a weight ratio of 50/50. When the intrinsic viscosity of the thermoplastic polyester resin is less than 0.4 dL/g, the resultant resin composition tends to be deteriorated in impact resistance. On the other hand, when the intrinsic viscosity of the thermoplastic polyester resin is more than 1.5 dL/g, the resultant resin composition tends to be deteriorated in fluidity. The end carboxyl group content in the thermoplastic polyester resin is usually 5 to 50 peq/g and preferably 10 to 30 peq/g. When the end carboxyl group content is less than 5 peq/g, the resultant resin composition tends to be deteriorated in impact resistance, whereas when the end carboxyl group content is more than 50 peq/g, the resultant resin composition tends to be insufficient in wet-heat resistance and thermal stability.

Further, as the thermoplastic polyester resin used in the present invention, there may also be used not only the virgin resin material, but also those thermoplastic polyester resins regenerated from used resin products, i.e., so-called material-recycled thermoplastic polyester resins. Examples of the used resin products mainly include containers, films, sheets and fibers. Among these products, more preferred are containers such as PET bottles. Further, as the regenerated thermoplastic polyester resins, there may also be used nonconforming products and crushed or pulverized products obtained from sprues and runners as well as pellets obtained by melting these products.

The respective constituting materials of the frame part (2) and the molded panel (5) are preferably blended with an inorganic filler for the purpose of enhancing a rigidity, a dimensional stability and a heat resistance thereof. Examples of the inorganic filler include titanium oxide, zinc oxide, barium sulfate, silica, calcium carbonate, iron oxide, alumina, calcium titanate, aluminum hydroxide, magnesium hydroxide, calcium carbonate, magnesium carbonate, calcium sulfate, sodium sulfate, calcium sulfite, magnesium silicate (talc), aluminum silicate (mica), calcium silicate (wollastonite), clay, glass beads, glass powder, glass fibers, quartz sand, quartz rock, quartz powder, shirasu, diatomaceous earth, white carbon, iron powder and aluminum powder. Among these inorganic fillers, preferred are magnesium silicate (talc), aluminum silicate (mica) and calcium silicate (wollastonite). These inorganic fillers may be used in combination of any two or more thereof.

The shape of the above inorganic filler may be any of a spherical shape, a cubic shape, a granular shape, an acicular shape, a plate shape and a fiber shape. From the viewpoints of an enhanced dimensional stability, a high rigidity and a good appearance of the finally obtained thermoplastic resin composition, among these inorganic filers, preferred are inorganic fillers having a plate shape or an acicular shape, and inorganic fillers having a laser diffraction particle size (D50) of not more than 10 μm.

The inorganic filler is used in an amount of usually 2 to 50 parts by weight and preferably 5 to 40 parts by weight based on 100 parts by weight of the constituting material of the frame part (2) or the molded panel (5). When the amount of the inorganic filler used is less than 2 parts by weight, the effect of enhancing a rigidity, a dimensional stability and a heat resistance of the resulting material tends to be lowered. When the amount of the inorganic filler used is more than 50 parts by weight, the resulting material tends to be deteriorated in impact resistance.

The inorganic filler may be used as such in a non-treated state. However, for the purpose of enhancing an affinity and an interfacial bonding strength to the resin components, the inorganic filler is preferably treated with an inorganic surface treating agent, a higher fatty acid or a derivative thereof such as esters and salts, a coupling agent, etc. In addition, the surface treatment may be conducted in combination with treatments with a dispersant such as various nonionic, cationic or anionic surfactants and various resins. With such combined treatments, the inorganic filler can be suitably enhanced in mechanical strength and kneading property.

Further, the respective constituting materials of the frame part (2) and the molded panel (5) may be blended with conductive carbon black and/or hollow nanocarbon fibers for the purpose of imparting an antistatic property and a conductivity for electrostatic coating thereto. Examples of the conductive carbon black include acetylene black obtained by thermal decomposition of acetylene gas, koechen black produced by furnace-type incomplete combustion of crude oils as a raw material, etc. The hollow nanocarbon fibers are in the form of a substantially cylindrical fibril constituted of an outside region comprising substantially continuous multiple layers of regularly oriented carbon atoms and an inside hollow region in which the respective layers and the hollow region is disposed in a substantially concentric relation to each other. Further, the regularly oriented carbon atoms in the outside region are in the form of a graphite. The diameter of the hollow region is usually 2 to 20 mm. Such hollow nanocarbon fibers are readily commercially available under the tradename "Graphite Fibril" from Hyperion Catharsis Inc.

As described above, it is preferred that the design part (1) is produced from a non-reinforced synthetic resin, whereas the frame part (2) and the molded panel (5) are produced from a composite reinforced synthetic resin. That is, in the present invention, the respective constituting materials of the frame part (2) and the molded panel (5) are preferably blended with reinforcing fibers. As the reinforcing fibers, there may be used, for example, at least one material selected from the group consisting of glass fibers, carbon fibers, aromatic polyamide fibers (aramid fibers), biodegradable fibers, talc, mica and wollastonite. Among these fibers, from the viewpoint of a low price, preferred are glass fibers, and more preferred are glass fibers having a section with a flatness of not less than 2 which is calculated from a ratio of a longer diameter to a shorter diameter as measured in the section of the fibers.

The reinforcing fibers may be used as such in a non-treated state. However, for the purpose of enhancing an affinity and an interfacial bonding strength to the resin components, the reinforcing fibers are preferably treated with an inorganic surface treating agent, a higher fatty acid or a derivative thereof such as esters and salts, a coupling agent, etc., similarly to the above inorganic filler. In addition, the surface treatment is preferably conducted in combination with treatments with a dispersant such as various nonionic, cationic or anionic surfactants and various resins. With such combined treatments, the reinforcing fibers can be suitably enhanced in mechanical strength and kneading property.

The reinforcing fibers used may have any fiber shape such as a roving, a yarn, a filament and a chopped strand. In addition, according to the aimed applications, the reinforcing fibers may also be used in the form of a fabric such as a roving cloth in the present invention, these fibers may be used in combination of any two or more thereof. The weight-average fiber length of the reinforcing fibers dispersed in the frame part (2) and the molded panel (5) is usually 1.5 to 10 mm and preferably 1.8 to 5 mm from the viewpoints of a good strength and a good dispersibility thereof.

The panel-shaped molded product of the present invention is usually produced by the below-mentioned two-color molding (co-injection molding) method. It is required that the design part (1) and the frame part (2) is strongly welded with each other upon molding. Therefore, the compositions of the design part (1) and the frame part (2) are selected so as to comprise at least one common component. More specifically, in the present invention, one or more kinds of components occupying not less than 10% by weight of the respective compositions of the design part (1) and the frame part (2) are preferably identical to each other.

The hard coating layer is a protective film for mainly preventing the surface of the design part (1) from being damaged and deteriorated as described above. Therefore, the constituting material of the hard coating layer must be produced from a transparent resin. As such a transparent resin, there may be appropriately used those materials known as hard coat agents. Examples of the hard coat agents include various hard coat agents such as silicone-based, acryl-based and silazane-based hard coat agents. Among these hard coat agents, from the viewpoint of enhancing an adhesion property and a weathering resistance, preferred are two coat-type hard coats comprising a primer layer formed before application of the hard coat agent.

Meanwhile, the materials for imparting various functions (such as heat ray shielding, ultraviolet absorption, thermochromism, photochromism and electrochromism) to an outermost layer of the hard coating layer may be appropriately selected from various conventionally known functional materials. Also, the resins for the transparent resin layer are not particularly limited and appropriately selected from various transparent resins as long as they do not have adverse influence on the aimed effects of the present invention and exhibit a sufficient adhesion to the molded panel (5) and the design part (1). Specific examples of the transparent resins include polyester resins, polycarbonate resins, acrylic resins and styrene-based resins.

Next, the method for producing the panel-shaped molded product of the present invention is explained. The panel-shaped molded product of the present invention may be usually produced by tow-color molding (double molding) method. As well known in the art, the tow-color molding is a molding method for injection-molding an integral product comprising two-color or two kinds of resins using an injection molding machine comprising two sets of injectors.

More specifically, the production method may be conducted as follows although it varies depending upon construction of a molding machine used. For example, the first material as a design part constituting material is injected from the first cylinder into a primary shaping mold to obtain the design part (1) as a primary molded product, followed by once opening the mold. Next, a mold turning table is rotated 180° while keeping the design part (1) attached to a core side thereof. Then, a secondary shaping mold positioned on the side opposite to the primary shaping mold is closed, and the second material as a frame part constituting material is injected from the second cylinder thereinto to obtain the frame part (2) as a secondary molded product. Thereafter, the mold is opened again to take out a panel-shaped molded product comprising an integrated body of the design part (1) and the frame part (2) therefrom. Meanwhile, in the above molding procedure, using two sets of molds mounted to the mold turning table in a back-to-back relation around a vertical axis of the turning table, it is possible to obtain one shot of the molded product every half turn of the turning table.

In addition, in order to provide the transparent resin layer, there may be specifically used, for example, such a method in which a transparent resin sheet is previously disposed in the mold when producing the panel-shaped molded product of the present invention by injection molding. The resins for the transparent resin layer are not particularly limited and appropriately selected from various transparent resins as long as they do not have adverse influence on the aimed effects of the present invention and exhibit a sufficient adhesion to the design part (1) or the frame part (2). Specific examples of the transparent resins include polyester resins, polycarbonate resins, acrylic resins and styrene-based resins. Meanwhile, as the method for producing the panel-shaped molded product of the present invention, there may also be adopted an insert molding method in which a molded product such as a sheet which is previously produced during the production process is disposed in a mold and molded therein.

Further, the modularized panel-shaped molded product according to the second embodiment may be readily produced by the method of individually molding the integrated body of the design part (1) and the frame part (2), and the molded panel (5), and then bonding these molded products to each other to obtain an integral product. As the bonding method, there may be used the method using an adhesive as well as vibration welding, laser welding, hot plate welding and injection welding. In addition to these methods, the modularized product may also be produced by a multi-color molding method. Furthermore, there may also be adopted an insert molding method in which molded products such as sheets which are previously produced during the production process are disposed in a mold and molded therein.

Examples of the coating method for production of the hard coating layer include spray coating, dip coating, flow coating, spin coating and bar coating. In addition, there may also be adopted the film insertion method, the transfer method of transferring a suitable chemical agent applied on a transfer film, etc. When the transparent resin layer is provided between the surfaces of the molded panel (5) and the design part (1) and the hard coating layer (7), there may be used, for example, the method in which a transparent resin sheet is previously disposed in a mold when producing the panel-shaped molded product of the present invention by injection molding.

As described above, the panel-shaped molded product of the present invention is constructed from the plate-shaped design part (1) and the frame part (2) injection-molded on one surface of the design part (1). More specifically, in the present invention, there is adopted such a laminated structure obtained by molding the design part (1) at the first stage and then molding the frame part (2) at the second stage by two-color molding method, etc. Therefore, since the resin for the frame part (2) is not melted out into a mold cavity for the design part, it is possible to prevent bleed-out of the resin present along an inner periphery of the frame part (2) toward the opening (3) thereof. In other words, since the design part (1) is previously molded, even if the resin for the frame part (2) present at its interface with the design part (1) is melted out, the melted resin is flowed into a mold cavity for the frame part. For this reason, such a phenomenon that the resin present at the inner periphery of the frame part (2) is bled out toward the opening (3) thereof can be prevented from occurring. In addition, when the design part (1) is produced from a transparent resin, even if the resin for the design part (1) is melted out toward the side of the frame part (2), the melted resin can be inhibited from being recognized from the front surface side of the design part (1).

Further, in the present invention, the frame part (2) is provided at its inner peripheral portion with the thickness changing region where the thickness of the frame part is reduced toward the side of a center of the frame part (2), and the ratio between the width $L_2$ of the thickness changing region and the thickness $t_2$ of the frame part (2) as well as the ratio between the width $L_2$ of the thickness changing region and the width $L_1$ of the frame part (2) are respectively adjusted to satisfy the specific relationships. Therefore, it is possible to reduce a shrinking force of the inner peripheral portion of the frame part (2) after molded to such an extent as not to give any adverse influence on the previously molded design part (1). With such a construction, in the present invention, it is possible to prevent formation of fine distortions in the form of recesses on the front surface of the design part (1) at the positions corresponding to the inner peripheral portion of the frame part (2). As a result, the panel-shaped molded product of the present invention can be used, for example, as windows for automobiles to impart a higher appearance, i.e., a more excellent finishing accuracy thereto.

Figure 10:
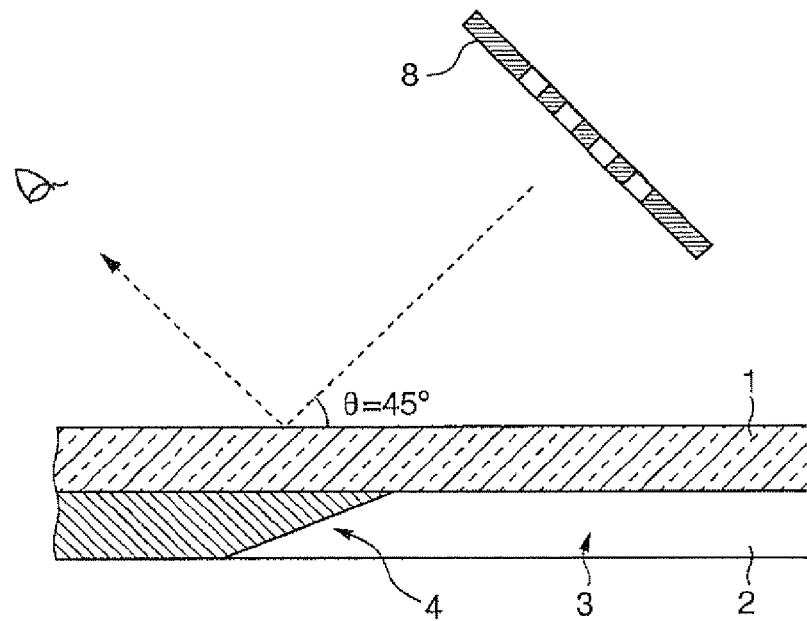
FIG. 10 is a schematic cross-sectional view showing a method of evaluating a finished condition of the surface of the panel-shaped molded product.

Meanwhile, in the present invention, presence or non-presence of the fine distortions on the surface of the design part (1) can be readily determined by the following evaluation method. That is, in the evaluation method for the distortions, as shown in FIG. 10, a grid (8) having, for example, a pitch of 20 mm is prepared and disposed at a projected angle (elevation angle) (θ) of 45° relative to the surface of the design part (1) of a sample (panel-shaped molded product), and light passed through the grid (8) as well as a shade of the grid (8) are allowed to reflect on the surface of the design part (1). The shade of the grid (8) on the surface of the design part (1) is observed at a symmetrical position with the grid (8) relative to an imaginary vertical line passing through the projected point on the surface of the design part (1). Upon the observation, if the surface of the design part (1) is flat, no distortion is recognized on the shade of the grid (8). Whereas, if any distortions are present on the surface of the design part (1), distortions are also observed on the shade of the grid (8).

Meanwhile, even though the design part (1) is not produced from a transparent resin, and the design part (1) and the frame part (2) are different in color from each other or tinted with the same color, the panel-shaped molded product of the present invention can exhibit a more excellent and higher appearance because neither bleed-out of the resins nor distortions on the surface of the design part (1) occurs.

Further, in the modularized panel-shaped molded product according to the second embodiment of the present invention, the molded panel (5), the design part (1), the frame part (2) and the hard coating layer (7) are integrated together, and the frame part (2) disposed to span between the outer peripheral portion of the design part (1) and the inner peripheral portion of the molded panel (5) along the opening thereof compensates bonding of the design part (1) to the molded panel (5), thereby further enhancing a bonding strength between the molded panel (5) and he design part (1). Therefore, the modularized product can be immediately used as one complete part. In other words, the panel-shaped molded product of the present invention which has a light weight and is more highly modularized can be immediately used, for example, in assembly processes for bodies of automobiles, thereby further enhancing productivity thereof.

EXAMPLES

The panel-shaped molded product having a shape as shown in FIG. 1 which was obtained by laminating the design part (1) and the frame part (2) by two-color molding method, was prepared as a sample. The design part (1) had a length of 150 mm, a width of 70 mm and a thickness $t_1$ of 2 mm. The frame part (2) had a thickness $t_2$ of 3 mm and a width $L_1$ of 18.5 to 20 mm, namely, the opening (3) of the frame part (2) had a length of 93 to 110 mm and a width of 30 to 33 mm.

PC (tradename "Iupilon S2000UR" produced by Mitsubishi Engineering-Plastics Corporation) was used as the material of the design part (1). The PC had a viscosity-average molecular weight (Mv) of 24,500, an average value $\alpha_A$ of linear expansion coefficients of $7 \times 10^{-5}$ [/° C.], and a ratio $\alpha_{ATD}/\alpha_{AMD}$ between the respective linear expansion coefficients of 1.0. Also, as the material of the frame part (2), there was used the resin composition comprising 70% by weight of the above PC, 30% by weight of PET and 7.5% by weight of glass fibers as a reinforcing material. The resin composition had an average value $S_B$ of molding shrinkage rates of $4.7 \times 10^{-3}$, and a ratio $S_{BTD}/S_{BMD}$ between the respective molding shrinkage rates of 1.7. The ratio $\alpha_A/S_B$ of the average value $\alpha_A$ of the linear expansion coefficients to the average value $S_B$ of the molding shrinkage rates was $1.49 \times 10^{-2}$.

Further, upon molding, the inner peripheral portion (4) of the frame part (2) was designed into respective structures as shown in FIGS. 2(a) to 2(c) and FIGS. 3 and 11, and the ratio of the width $L_2$ of the thickness changing region to each of the thickness $t_2$ and width $L_1$ of the frame part (2) was changed variously. In the respective embodiments, occurrence or non-occurrence of bleed-out at the inner periphery of the frame part (2) as well as presence or non-presence of distortions on the front surface of the design part (1) at positions corresponding to the inner peripheral portion (4) of the frame part (2), were observed and confirmed. As the evaluation method for the distortions, there was used the above evaluation method as shown in FIG. 10. The results as shown in the following Table 1 were obtained. Meanwhile, as to the structure of inner peripheral portion (4) in Example 2 of Table 1, the portion has a stepped cross-sectional shape as shown in FIG. 2(c), but the number of steps therein is changed to two.

TABLE 1

Figure 11:
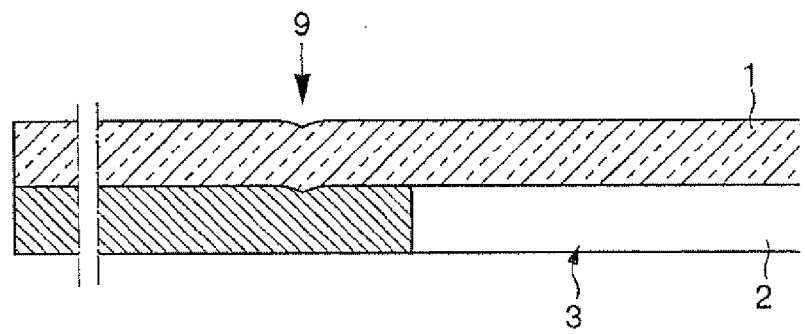
FIG. 11 is a vertical cross-sectional view partially showing a layer structure of a window frame portion of the panel-shaped molded product used as a window for automobiles.

| Samples | Structure of inner peripheral portion (4) | Thickness of frame part ($t_2$) | Width of frame part ($L_1$) | Width of thickness changing region ($L_2$) |
|---|---|---|---|---|
| Example 1 | FIG. 2(a) | 3 | 20 | 6 |
| Example 2 | FIG. 2(c) | 3 | 20 | 6 |
| Example 3 | FIG. 3 | 3 | 20 | 6 |
| Example 4 | FIG. 2(c) | 3 | 97 | 20 |
| Example 5 | FIG. 2(c) | 3 | 75 | 15 |
| Example 6 | FIG. 2(c) | 3 | 90 | 25 |
| Comparative Example 1 | FIG. 11 | 3 | 20 | — |
| Comparative Example 2 | FIG. 2(b) | 3 | 18.5 | 4.5 |
| Comparative Example 3 | FIG. 2(a) | 3 | 20 | 3 |

| Samples | Ratio of width of thickness changing region to thickness of frame part ($L_2/t_2$) | Ratio of thickness changing region to width of frame part ($L_2/L_1$) | ($L_2/t_2$) × ($L_2/L_1$) | Evaluation of distortions |
|---|---|---|---|---|
| Example 1 | 2 | 0.3 | 0.6 | B |
| Example 2 | 2 | 0.3 | 0.6 | A |
| Example 3 | 2 | 0.3 | 0.6 | A |
| Example 4 | 6.7 | 0.21 | 1.38 | A |
| Example 5 | 5 | 0.2 | 1 | A |
| Example 6 | 8.3 | 0.27 | 2.21 | A |
| Comparative Example 1 | 0 | 0 | 0 | C |
| Comparative Example 2 | 1.5 | 0.24 | 0.36 | C |
| Comparative Example 3 | 1 | 0.3 | 0.3 | C |

Note
Evaluation of distortions:
A: No distortions;
B: Slight distortions substantially unrecognizable;
C: Recognizable distortions

The invention claimed is:

1. A panel-shaped molded product with a laminated structure comprising a plate-shaped design part produced from a non-reinforced synthetic resin and a frame part produced from a composite reinforced synthetic resin injection-molded on one surface of the design part, wherein the frame part has an inner peripheral portion that is closely attached to the design part and provided with a thickness changing region where a thickness of the frame part is reduced toward a side of a center of the frame part, and a ratio $L_2/t_2$ and a ratio $L_2/L_1$ in which $t_2$ is a thickness of the frame part, $L_1$ is a width of the frame part and $L_2$ is a width of the thickness changing region, satisfy a relationship represented by the following formula (1):

$$(L_2/t_2) \times (L_2/L_1) \geqq 0.4 \qquad (1).$$

2. A panel-shaped molded product according to claim 1, wherein a ratio of $\alpha_A/S_B$ in which $\alpha_A$ is an average value of a linear expansion coefficient $\alpha_{AMD}$ in a flowing direction and a linear expansion coefficient $\alpha_{ATD}$ in a direction perpendicular to the flowing direction upon injection-molding the design part, and $S_B$ is an average value of a molding shrinkage rate $S_{BMD}$ in a flowing direction and a molding shrinkage rate $S_{BTD}$ in a direction perpendicular to the flowing direction upon injection-molding the frame part, lies within the range represented by the following formula (2):

$$0.8\times10^{-2}<(\alpha_A/S_B)<2.3\times10^{-2}[/°C.] \quad (2)$$

wherein the average value $\alpha_A$ of the linear expansion coefficients=$(\alpha_{AMD}+\alpha_{ATD})/2$; and the average value $S_B$ of the molding shrinkage rates=$(S_{BMD}+S_{BTD})/2$.

3. A panel-shaped molded product according to claim 2, wherein the average value $\alpha_A$ of the linear expansion coefficients of the design part, and a ratio of the linear expansion coefficient $\alpha_{ATD}$ to the linear expansion coefficient $\alpha_{AMD}$ ($\alpha_{ATD}/\alpha_{AMD}$) lie within the ranges represented by the following formulae (3) and (4), respectively:

$$2\times10^{-5}\leq\alpha_A\leq7.5\times10^{-5}[/°C.] \quad (3)$$

$$\alpha_{ATD}/\alpha_{AMD}<2.0 \quad (4).$$

4. A panel-shaped molded product according to claim 2, wherein the average value $S_B$ of the molding shrinkage rates of the frame part, and a ratio of the molding shrinkage rate $S_{BMD}$ to the molding shrinkage rate $S_{BTD}$, ($S_{BMD}/S_{BTD}$) lie within the ranges represented by the following formulae (5) and (6), respectively:

$$4.5\times10^{-3}\leq S_B\leq7\times10^{-3} \quad (5)$$

$$S_{BTD}/S_{BMD}<3 \quad (6)$$

wherein the average value $S_B$ of the molding shrinkage rates of the frame part, and the ratio of the molding shrinkage rate $S_{BTD}$ to the molding shrinkage rate $S_{BMD}(S_{BTD}/S_{BMD})$ are respectively values as measured with respect to a flat square plate having a size of 100 mm square and a thickness of 3.2 mm which is obtained by injection-molding a resin forming the frame part.

5. A panel-shaped molded product according to claim 1, wherein one or more components occupying 10% by weight or more of a composition of the design part are the same as those occupying 10% by weight or more of a composition of the frame part.

6. A panel-shaped molded product according to claim 1, wherein the design part is produced from a transparent synthetic resin.

7. A panel-shaped molded product according to claim 1, wherein a reinforcing material used in the composite reinforced synthetic resin forming the frame part is at least one material selected from the group consisting of glass fibers, carbon fibers, aramid fibers, biodegradable fibers, talc, mica and wollastonite.

8. A panel-shaped molded product according to claim 7, wherein the reinforcing material is glass fibers having a flat section with a flatness of not less than 2 as calculated from a ratio of a longer diameter to a shorter diameter of the section.

9. A panel-shaped molded product according to claim 7, wherein the fibers dispersed in the molded product as the reinforcing material have a weight-average fiber length of 1.5 to 10 mm.

10. A panel-shaped molded product according to claim 1, wherein the molded product is used as a window for side doors, back doors, slide doors, hoods, roofs and their similar parts of automobiles.

11. A panel-shaped molded product according to claim 1 which is integrated with a molded panel having an opening for window, wherein the design part is fitted into the opening of the molded panel and the frame part is positioned on one surface of the molded panel; a hard coating layer is disposed over an opposite surface of the molded panel including a surface of the design part; and the frame part is disposed to span between an outer peripheral portion of the design part and an inner peripheral portion of the molded panel along the opening thereof, and integrally connected with the molded panel.

12. A panel-shaped molded product according to claim 11, wherein the molded panel is produced from an opaque resin.

13. A panel-shaped molded product according to claim 11, wherein an overlapping area between the design part and the frame part is less than 40% of an area of the surface of the design part.

14. A panel-shaped molded product according to claim 11, wherein when viewed along a cross-sectional thickness direction of the panel-shaped molded product, a connecting portion between the outer peripheral portion of the design part and the inner peripheral portion of the molded panel along the opening thereof has an engaging structure in which the connecting portion is engaged with the frame part.

15. A panel-shaped molded product according to claim 14, wherein the engaging structure is constructed such that the connecting portion between the outer peripheral portion of the design part and the inner peripheral portion of the molded panel along the opening thereof is provided on its side facing the frame part with a projection, and the projection is engaged with a groove formed on the frame part.

16. A panel-shaped molded product according to claim 14, wherein the engaging structure is constructed such that the connecting portion between the outer peripheral portion of the design part and the inner peripheral portion of the molded panel along the opening thereof is provided on its side facing the frame part with a groove, and the groove is engaged with a projection formed on the frame part.

17. A panel-shaped molded product according to claim 11, wherein when viewed along a cross-sectional thickness direction of the panel-shaped molded product, the inner peripheral portion of the molded panel along the opening thereof has an engaging structure in which the inner peripheral portion of the molded panel is engaged with the frame part.

18. A panel-shaped molded product according to claim 17, wherein the engaging structure is constructed such that the inner peripheral portion of the molded panel along the opening thereof is provided on its side facing the frame part with a projection that is bent to cover the outer peripheral portion of the design part, and the projection is engaged with a groove formed on the frame part.

19. A panel-shaped molded product according to claim 11, wherein when viewed along a cross-sectional thickness direction of the panel-shaped molded product, the outer peripheral portion of the design part has an engaging structure in which the outer peripheral portion of the design part is engaged with the frame part.

20. A panel-shaped molded product according to claim 19, wherein the engaging structure is constructed such that the outer peripheral portion of the design part is provided on its side facing the frame part with a projection that is projected outwardly along a plane direction of the design part to cover the inner peripheral portion of the molded panel along the opening thereof, and the outer peripheral portion of the design part including the projection is engaged with a thin stepped portion formed on the inner peripheral portion of the frame part.

21. A panel-shaped molded product according to claim 11, wherein the frame part is provided on its surface opposite to the molded panel and the design part with a fitting piece that is projected therefrom to mount the panel-shaped molded product to other parts.

22. A panel-shaped molded product according to claim 11, wherein the hard coating layer has a multilayer structure including two or more layers, and an outermost layer in the multilayer structure has a highest hardness.

23. A panel-shaped molded product according to claim 11, wherein the hard coating layer has at least one function selected from the group consisting of heat ray shielding, ultraviolet absorption, thermochromism, photochromism and electrochromism.

24. A panel-shaped molded product according to claim 11, wherein the hard coating layer is disposed on the side of one surface of the molded panel including the surface of the design part.

25. A panel-shaped molded product according to claim 11, wherein the molded panel is produced from a resin composition comprising 100 parts by weight of a polymer alloy comprising 10 to 90% by weight of an aromatic polycarbonate resin and 10 to 90% by weight of a thermoplastic polyester resin with the proviso that a total amount of the aromatic polycarbonate resin and the thermoplastic polyester resin is 100% by weight, and 2 to 50 parts by weight of an inorganic filler; and the frame part is produced from a resin composition comprising 100 parts by weight of the aromatic polycarbonate resin and/or the thermoplastic polyester resin, and 1 to 50 parts by weight of reinforcing fibers.

26. A panel-shaped molded product according to claim 25, wherein the inorganic filler used in the molded panel is at least one material selected from the group consisting of talc, mica and wollastonite.

27. A panel-shaped molded product according to claim 11, wherein the molded product is used as a side door, a back door, a slide door, a hood or a roof of automobiles, or similar parts thereof.

* * * * *